US012789201B2

(12) United States Patent
Osborne et al.

(10) Patent No.: US 12,789,201 B2
(45) Date of Patent: Nov. 10, 2026

(54) METHODS AND SYSTEMS FOR CLASSIFICATION AND RECOVERY

(71) Applicant: Somerset International Finance Designated Activity Company, Dublin (IE)

(72) Inventors: David Osborne, Redland Bay (AU); James Graham, St. Lucia (AU); Geoff Orr, Shorncliffe (AU); James C. Fisher, II, Morgantown, WV (US)

(73) Assignee: Somerset International Finance Designated Activity Company, Dublin (IE)

( * ) Notice: Subject to any disclaimer, the term of this patent is extended or adjusted under 35 U.S.C. 154(b) by 0 days.

(21) Appl. No.: 18/426,950

(22) Filed: Jan. 30, 2024

(65) Prior Publication Data

US 2024/0253060 A1 Aug. 1, 2024

Related U.S. Application Data

(60) Provisional application No. 63/482,185, filed on Jan. 30, 2023.

(51) Int. Cl.
*B04B 5/10* (2006.01)
*B04B 15/12* (2006.01)

(52) U.S. Cl.
CPC ................ *B04B 5/10* (2013.01); *B04B 15/12* (2013.01)

(58) Field of Classification Search
CPC .. B04B 5/10; B04B 15/12; B04B 3/00; Y02E 50/10; Y02E 50/30; C08H 6/00; C08H 8/00; C07G 1/00; Y02P 30/20; Y02P 10/20; Y02P 20/10; Y02P 60/87; Y02P 20/145; C08L 97/005; C12P 19/02; C12P 7/10; C12P 19/04; C12P 2201/00; C12P 19/14; C12P 2203/00; C10G 2300/1014; C10G 1/00; C10G 2400/30; C10G 2300/1011; D21C 11/0007; Y02W 30/62; Y02W 30/91; C10B 53/02; A23L 33/105; C02F 1/66;

(Continued)

(56) References Cited

U.S. PATENT DOCUMENTS

| | | | | |
|---|---|---|---|---|
| 2,214,717 A * | 9/1940 | Breerwood | C04B 7/38 | 106/770 |
| 3,579,442 A * | 5/1971 | Gerwig | C10L 9/00 | 44/621 |

(Continued)

FOREIGN PATENT DOCUMENTS

| | | |
|---|---|---|
| CN | 115591656 A | 1/2023 |
| WO | 2022053932 A1 | 3/2022 |

OTHER PUBLICATIONS

International Search Report and Written Opinion issued in international application No. PCT/IB2024/050856, dated May 27, 2024 (11 pages).

*Primary Examiner* — Claire X Wang
*Assistant Examiner* — Shuyi S. Liu
(74) *Attorney, Agent, or Firm* — Eversheds Sutherland (US) LLP

(57) ABSTRACT

Methods and systems for classification and recovery of certain solids from streams, such as liquid waste streams. Methods including classification with at least one solid bowl centrifuge, followed by a valorization procedure. The valorization procedure may be a flotation procedure, which may include a single-step or two-step procedure.

22 Claims, 9 Drawing Sheets

(58) Field of Classification Search
CPC .......... C02F 9/00; C02F 11/04; C02F 11/127; C02F 2101/20; C02F 2101/105; C04B 20/023; C04B 28/04; C04B 18/0418; C04B 18/167; B03D 1/14; B03D 1/02; B03D 2201/06; B03D 1/0046; B07B 1/22; E21B 21/068; E21B 43/34
USPC ............................................................ 494/37
See application file for complete search history.

(56) References Cited

U.S. PATENT DOCUMENTS

| | | | | | |
|---|---|---|---|---|---|
| 4,421,641 | A * | 12/1983 | Blazy | B03D 1/01 252/61 |
| H981 | H * | 11/1991 | Venkatachari | 209/172.5 |
| 6,341,697 | B1 * | 1/2002 | Miller | B03D 1/01 252/61 |

* cited by examiner

METHODS AND SYSTEMS FOR CLASSIFICATION AND RECOVERY

CROSS-REFERENCE TO RELATED APPLICATIONS

This application claims priority to U.S. Provisional Patent Application No. 63/482,185, filed Jan. 30, 2023, which is incorporated herein by reference.

BACKGROUND

Several industrial and mining processes produce waste streams that are discarded. These waste streams, however, can include one or more valuable materials.

A form of classification (e.g., cyclonic separation) and beneficiation (e.g., mineral flotation, or magnetic separation) are frequently used when attempting to recover solids from liquid streams, such as liquid waste streams. These techniques, however, can be ineffective and/or inefficient, especially when a stream includes solids of relatively smaller sizes. Typically, a stream is subjected to cyclonic separation in an effort to remove materials that are not amenable to some separation procedures, such as flotation, due, for example, to particle size. With cyclonic separation, however, it is difficult to remove materials having particle sizes less than about 40 μm, because smaller cyclones configured to remove such materials can face one or more operational difficulties.

There remains a need for methods for effectively and/or efficiently recovering solids, such as valuable solids, from streams, such as waste streams, including methods that can remove solids having smaller sizes that undesirably impact recovery efforts.

BRIEF SUMMARY

Provided herein are methods and systems that may include classifying a solids-containing stream with a solid bowl centrifuge prior to valorization (e.g., flotation or magnetic separation) in order to eliminate or reduce the amount of smaller and/or larger particles and/or contaminants in the stream. Surprisingly, the solid bowl centrifuges of the methods and systems described herein, may achieve a relatively precise classification, such as a classification that is more precise than those achieved by cyclones or other apparatuses. After classification with one or more solid bowl centrifuges, a stream may be subjected to any known valorization procedure, including, but not limited to, those described herein, which may include flotation, such as a dual-step flotation procedure (e.g., a flotation procedure that includes reverse flotation and direct flotation or combinations with magnetic separation). One or more parameters of the valorization procedure may be improved due to classification via one or more solid bowl centrifuges.

In one aspect, methods of classification and recovery are provided. In some embodiments, the methods include providing a first stream that includes a first plurality of solids. The first plurality of solids may include a material of interest, such as any of those described herein. The first plurality of solids may include a first portion having sizes greater than a first cut-off particle size, and a second portion having sizes less than or equal to a first cut-off particle size.

The methods may include disposing the first stream in a first solid bowl centrifuge to produce a first cake and a first centrate. The first cake may include a second plurality of solids, which may include at least 50%, by weight, of the first portion of the first plurality of solids. The first centrate may include a third plurality of solids, which may include at least 50%, by weight, of the second portion of the first plurality of solids.

The methods may include subjecting the first cake or the first centrate to a valorization procedure to produce a product stream including at least a portion of the material of interest; or disposing the first cake or the first centrate in a second solid bowl centrifuge to produce (a) a second cake comprising a fourth plurality of solids, and (b) a second centrate comprising a fifth plurality of solids, and subjecting the second cake or the second centrate to a valorization procedure to produce a product stream that includes at least a portion of the material of interest.

In another aspect, systems are provided, including systems for classification and recovery. In some embodiments, the systems include a first solid bowl centrifuge, optionally a second solid bowl centrifuge, and a valorization apparatus, such as a flotation apparatus. The valorization apparatus may be configured to receive a cake, centrate, or a diluted cake from the first solid bowl centrifuge or optionally the second solid bowl centrifuge. The valorization apparatus may be a flotation apparatus, which may include a reverse flotation apparatus and a direct flotation apparatus. The valorization apparatus may be an apparatus capable of performing magnetic separation by concentrating materials that are ferromagnetic or paramagnetic.

Additional aspects will be set forth in part in the description which follows, and in part will be obvious from the description, or may be learned by practice of the aspects described herein or derived from targeted research work. The advantages described herein may be realized and attained by means of the elements and combinations particularly pointed out in the appended claims. It is to be understood that both the foregoing general description and the following detailed description are exemplary and explanatory only and are not restrictive.

DETAILED DESCRIPTION

Figure 1A:
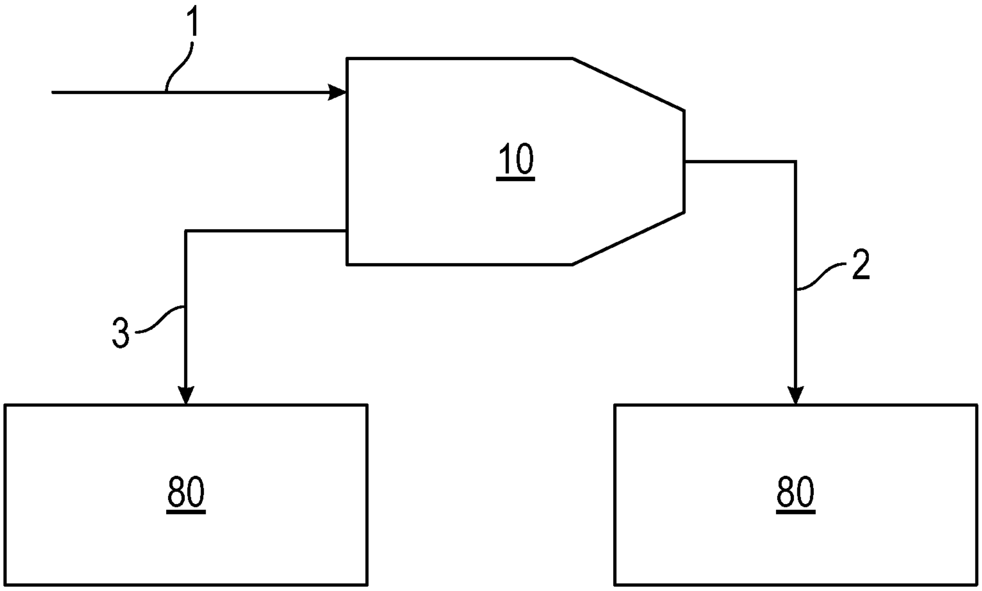
FIG. 1A depicts an embodiment of a system and a method for classification with a solid bowl centrifuge.

Provided herein are methods and systems for classification and recovery.

In some embodiments, the methods include providing a first stream that includes a first plurality of solids. The first plurality of solids may include a material of interest. The solids may include particles of any sizes and/or shapes. The solids may include regularly or irregularly shaped particles.

The first plurality of solids may include a first portion and a second portion, which are distinguished by a first cut-off particle size. In some embodiments, a first portion of the first plurality of solids has sizes greater than a first cut-off particle size, and a second portion of the first plurality of solids has sizes less than or equal to a first cut-off particle size.

In some embodiments, the methods include disposing the first stream in a first solid bowl centrifuge to produce a first cake and first centrate.

The phrases "cut-off particle size" or "cut point", as used herein, refer to a particle size at which 50%, by weight, of the particles of the particle size in a stream report to a cake, and 50%, by weight, of the particles of the particle size in the stream report to the centrate, when the stream is processed with a solid bowl centrifuge. A cut-off particle size may be determined in several ways, but, for purposes of this disclosure, each cut-off particle size (such as each first cut-off particle size and each second cut-off particle size) is determined by the following procedure. (1) Sampling: a cake (e.g., a first cake) and a centrate (e.g., a first centrate) are sampled and their solids mass rates are determined (dry solids tonnes per hour). (2) Analysis: the cake and the centrate are sized to determine their size distributions, including the mass distributions across the size ranges. The size distribution is determined using either sieve sizing or laser sizing within their respective size limitations. Sieves are typically used for coarse fractions (e.g., greater than 20 μm), while lasers are used for fractions not amenable to sieving. (3) Cutoff size determination: For each size fraction measured (e.g., 5-7 micron) the dry solids mass rate (dry tph) of that fraction (% weight of size fraction multiplied by dry solids mass rate (dry tph) of stream) in the cake is divided by the sum of the mass rate of that fraction in both the cake and centrate. This calculation yields a percentage of that fraction reporting to the cake. This determination is applied to all size fractions measured. The point at which the weight percent reporting to cake is 50% is the cut-off particle size.

The first cake may include a second plurality of solids, and the second plurality of solids may include at least 50%, at least 55%, at least 60%, at least 65%, at least 70%, at least 75%, at least 80%, at least 85%, at least 95%, or at least 99%, by weight, of the first portion of the first plurality of solids of the first stream. For example, if the first stream includes 100 units of solids having sizes greater than or equal to a first cut-off particle size, then at least 50 units, at least 55 units, at least 60 units, at least 65 units, at least 70 units, at least 75 units, at least 80 units, at least 85 units, at least 95 units, or at least 99 units may report to the first cake.

The first centrate may include a third plurality of solids, and the third plurality of solids may include at least 50%, at least 55%, at least 60%, at least 65%, at least 70%, at least 75%, at least 80%, at least 85%, at least 95%, or at least 99%, by weight, of the second portion of the first plurality of solids of the first stream. For example, if the first stream includes 100 units of solids having sizes less than or equal to a first cut-off particle size, then at least 50 units, at least 55 units, at least 60 units, at least 65 units, at least 70 units, at least 75 units, at least 80 units, at least 85 units, at least 95 units, or at least 99 units may report to the first centrate.

In some embodiments, the methods include subjecting the first cake and/or the first centrate to a valorization procedure to produce a product stream. The product stream may include at least a portion of the material of interest, as described herein.

Embodiments of systems and methods are depicted at FIG. 1A, FIG. 1B, FIG. 1C, and FIG. 1D.

In the embodiment depicted at FIG. 1A, a first stream 1 that includes a first plurality of solids is disposed in a first solid bowl centrifuge 10 to produce a first cake 2 and a first centrate 3. The first stream 1 includes a first portion of solids having sizes greater than a first cut-off particle size, and an amount of the first portion of the plurality of solids (e.g., at least 50%, at least 55%, at least 60%, at least 65%, at least 70%, at least 75%, at least 80%, at least 85%, at least 95%, or at least 99%, by weight, etc.) are present in the first cake 2. The first stream 1 includes a second portion of solids having sizes less than or equal to a first cut-off particle size, and an amount of the second portion of the first plurality of solids (e.g., at least 50%, at least 55%, at least 60%, at least 65%, at least 70%, at least 75%, at least 80%, at least 85%, at least 95%, or at least 99%, by weight, etc.) are present in the first centrate 3. Therefore, the first solid bowl centrifuge 10, as described herein, may achieve a classification of the first stream 1 at a first cut-off particle size. The cut-off particle size may be any of those described herein; for example, the cut-off particle size may be about 40 μm or less, or about 20 μm or less, such as 3 μm or 4 μm. The first cake 2 may be discarded (not shown), disposed in a second solid bowl centrifuge (see, e.g., FIG. 1B, FIG. 1C), or subjected to a valorization procedure 80, such as any of those described herein. Similarly, the first centrate 3 may be discarded (not shown), disposed in a second solid bowl centrifuge (see, e.g., FIG. 1D, FIG. 1E), or subjected to a valorization procedure 80, such as any of those described herein.

A first cake produced by the methods described herein may be discarded, subjected to a valorization procedure, or disposed in a second solid bowl centrifuge.

In some embodiments, the methods include disposing a first cake in a second solid bowl centrifuge to produce a second cake and a second centrate. The second cake may include a fourth plurality of solids, and the second centrate may include a fifth plurality of solids. The second cake and/or the second centrate may be subjected to a valorization procedure to produce a product stream that includes at least a portion of the material of interest.

The first cake, as explained herein, may include a second plurality of solids. The second plurality of solids may include a first portion having sizes greater than a second cut-off particle size, and a second portion having sizes less than or equal to a second cut-off particle size.

The fourth plurality of solids of the second cake may include at least 50%, at least 55%, at least 60%, at least 65%, at least 70%, at least 75%, at least 80%, at least 85%, at least 95%, or at least 99%, by weight, of the first portion of the second plurality of solids of the first cake; and the fifth plurality of solids of the second centrate may include at least 50%, at least 55%, at least 60%, at least 65%, at least 70%, at least 75%, at least 80%, at least 85%, at least 95%, or at least 99%, by weight, of the second portion of the second plurality of solids of the first cake.

Figure 1B:
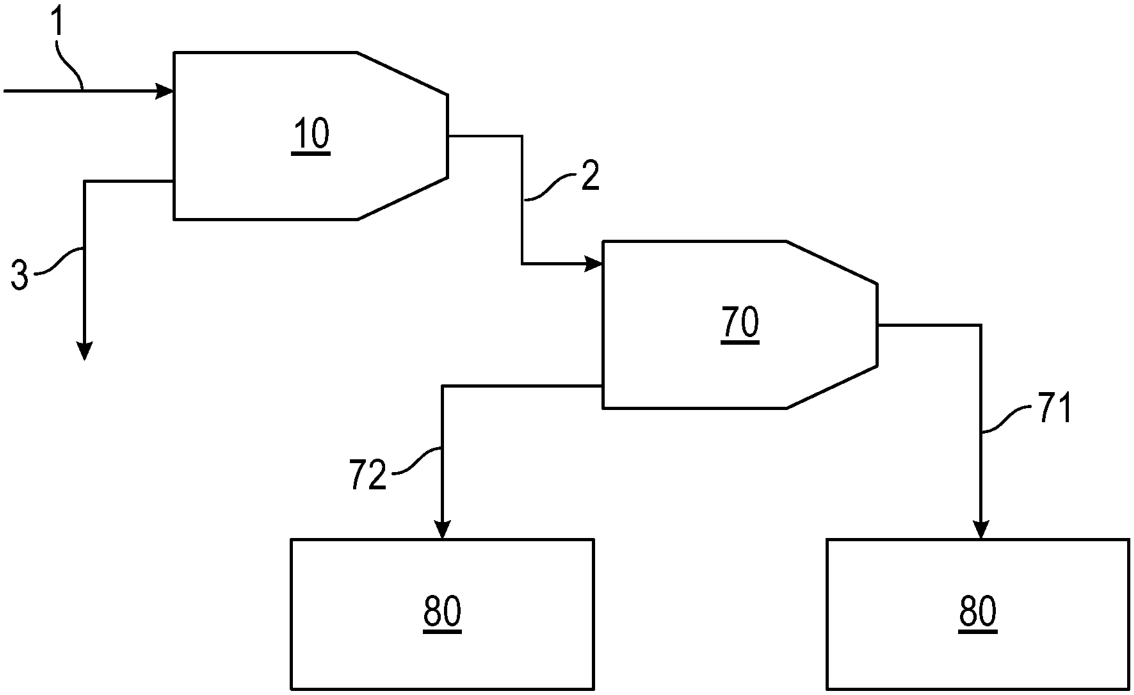
FIG. 1B depicts an embodiment of a system and a method for classification with a solid bowl centrifuge.

In the embodiment depicted at FIG. 1B, the first centrate 3 of FIG. 1A is discarded, and the first cake 2 of FIG. 1A is disposed in a second solid bowl centrifuge 70. The first cake 2 may optionally be diluted prior to being disposed in the second solid bowl centrifuge 70. The second solid bowl centrifuge 70 produces a stream that includes a second centrate 72 and a second cake 71. The first cake 2 may include a first portion of solids having sizes greater than a second cut-off particle size, and a second portion of solids having sizes less than or equal to the second cut-off particle size. An amount (e.g., at least 50%, at least 55%, at least 60%, at least 65%, at least 70%, at least 75%, at least 80%, at least 85%, at least 95%, or at least 99%, by weight, etc.) of the first portion of the solids of the first cake 2 may be present in the second cake 71, and an amount (e.g., at least 50%, at least 55%, at least 60%, at least 65%, at least 70%, at least 75%, at least 80%, at least 85%, at least 95%, or at least 99%, by weight, etc.) of the second portion of the solids of the first cake 2 may be present in the second centrate 72. The second centrate 72 may be discarded (not shown) or subjected to a valorization procedure 80. The second cake 71 may be discarded (not shown) or subjected to a valorization procedure 80.

Figure 1C:
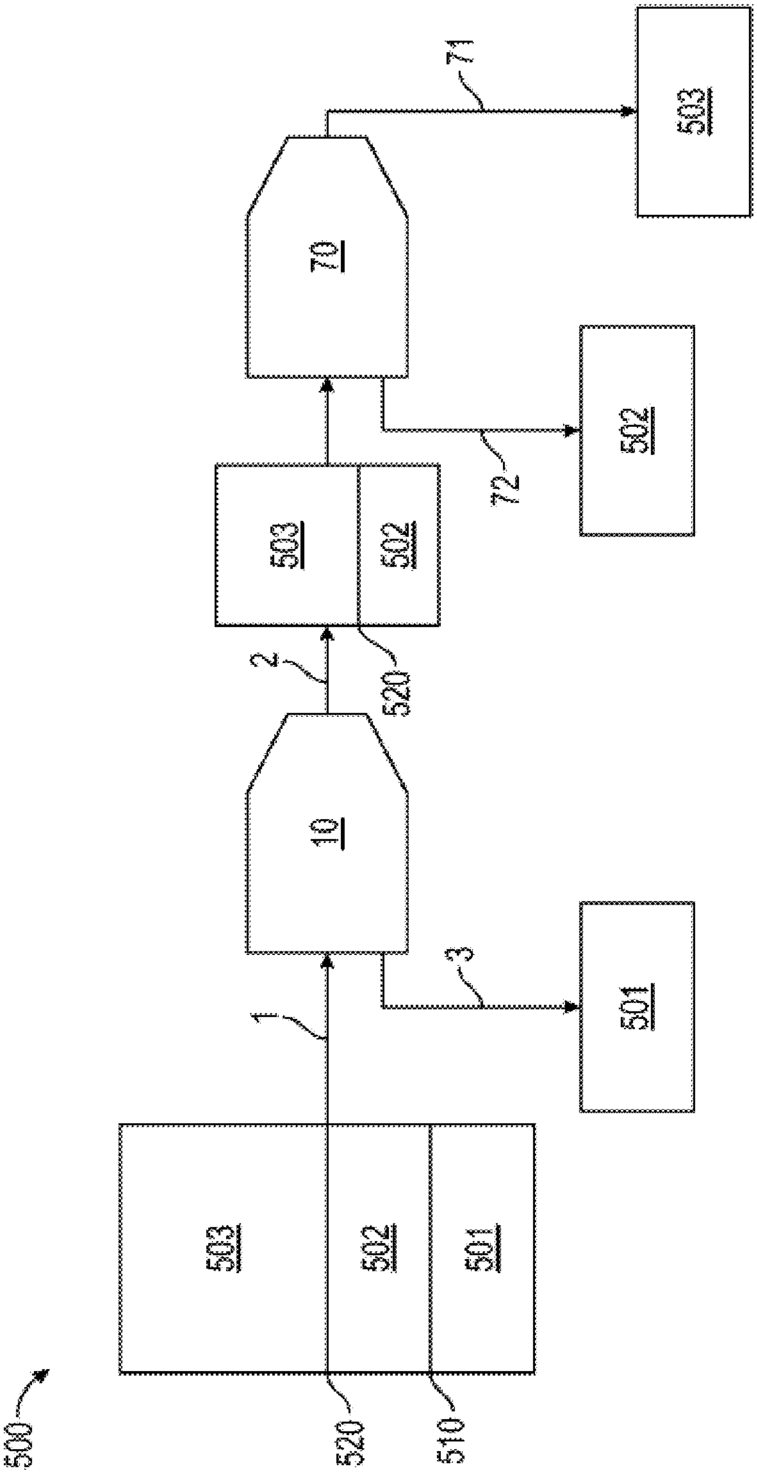
FIG. 1C depicts an embodiment of a system and a method for classification with a solid bowl centrifuge.

FIG. 1C depicts a schematic of an embodiment of a plurality of solids 500, and how, in some embodiments, the plurality of solids 500 may be processed by the method and system of FIG. 1B. In the embodiment depicted at FIG. 1C, a first cut-off particle size 510 is less than a second cut-off particle size 520. The plurality of solids 500 of FIG. 1C include solids 501 having sizes less than or equal to a first cut-off particle size 510, solids 501, 502 having sizes less than or equal to a second cut-off particle size 520, and solids 503 having sizes greater than the second cut-off particle size 520. A first stream 1 including the plurality of solids 500 is disposed in the first solid bowl centrifuge 10 to achieve classification of the plurality of solids 500 at the first cut-off particle size 510. Therefore, an amount (e.g., at least 50%, at least 55%, at least 60%, at least 65%, at least 70%, at least 75%, at least 80%, at least 85%, at least 95%, or at least 99%, by weight, etc.) of the solids 501 having sizes less than or equal to the first cut-off particle 510 size are present in the first centrate 3, and the solids 502, 503 having sizes greater than the first cut-off particle size 510 may be present in the first cake 2. The first cake 2, optionally a diluted first cake 2, is disposed in the second centrifuge 70 to achieve classification of the solids 502, 503 at the second cut-off particle size 520. Therefore, the solids 502 having sizes less than or equal to the second particle cut-off size 520 appear in the second centrate 72, and the solids 503 having sizes greater than the second cut-off particle size 520 may be present in the second cake 71. The second cake 71 then may be subjected to a valorization procedure, as shown, for example, at FIG. 1B (80). Additionally, or alternatively, the second centrate 72 may be subjected to a valorization procedure, as shown, for example, at FIG. 1B (80).

A first centrate produced by the methods described herein may be discarded, subjected to a valorization procedure, or disposed in a second solid bowl centrifuge.

In some embodiments, the methods include disposing a first centrate in a second solid bowl centrifuge to produce a second cake and a second centrate. The second cake may include a fourth plurality of solids, and the second centrate may include a fifth plurality of solids. The second cake and/or the second centrate may be subjected to a valorization procedure to produce a product stream that includes at least a portion of the material of interest.

A first portion of the third plurality of solids of the first centrate may have sizes greater than a second cut-off particle size, and a second portion of third plurality of solids of the first centrate may have sizes less than or equal to a second cut-off particle size. Therefore, the fourth plurality of solids of the second cake may include at least 50%, at least 55%, at least 60%, at least 65%, at least 70%, at least 75%, at least 80%, at least 85%, at least 95%, or at least 99%, by weight, of the first portion of the third plurality of solids of the first centrate; and the fifth plurality of solids may include at least 50%, at least 55%, at least 60%, at least 65%, at least 70%, at least 75%, at least 80%, at least 85%, at least 95%, or at least 99%, by weight, of the second portion of the third plurality of solids of the first centrate.

Figure 1D:
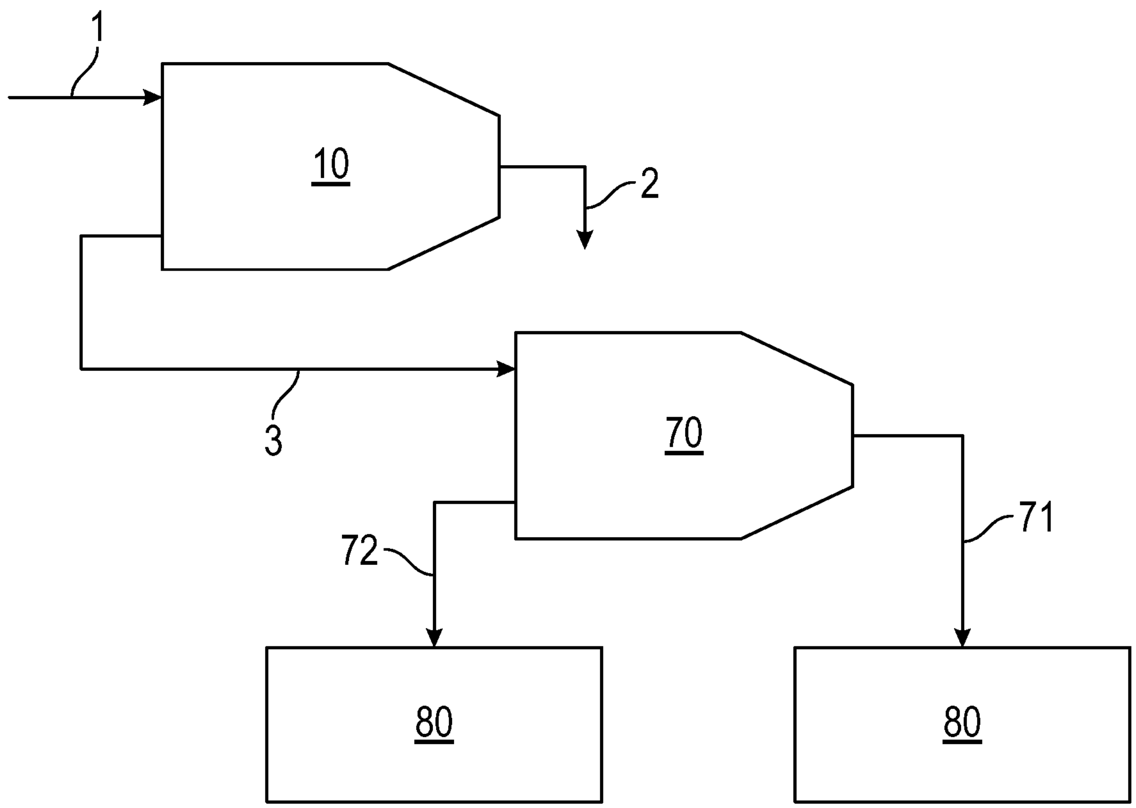
FIG. 1D depicts an embodiment of a system and a method for classification with a solid bowl centrifuge.

In the embodiment depicted at FIG. 1D, the first cake 2 of FIG. 1A is discarded, and the first centrate 3 of FIG. 1A is disposed in a second solid bowl centrifuge 70. The first centrate 3 may optionally be diluted or concentrated prior to being disposed in the second solid bowl centrifuge 70. The second solid bowl centrifuge 70 produces a second centrate 72 and a second cake 71. The first centrate 3 may include a first portion of solids having sizes greater than a second cut-off particle size, and a second portion of solids having sizes less than or equal to the second cut-off particle size. An amount (e.g., at least 50%, at least 55%, at least 60%, at least 65%, at least 70%, at least 75%, at least 80%, at least 85%, at least 95%, or at least 99%, by weight, etc.) of the first portion of the solids of the first centrate 3 may be present in the second cake 71, and an amount (e.g., at least 50%, at least 55%, at least 60%, at least 65%, at least 70%, at least 75%, at least 80%, at least 85%, at least 95%, or at least 99%, by weight, etc.) of the second portion of the solids of the first centrate 3 may be present in the stream that includes the second centrate 72. The second centrate 72 may be discarded (not shown) or subjected to a valorization procedure 80, such as any of those described herein. The second cake 71 may be discarded (not shown) or subjected to a valorization procedure 80, such as any of those described herein.

Figure 1E:
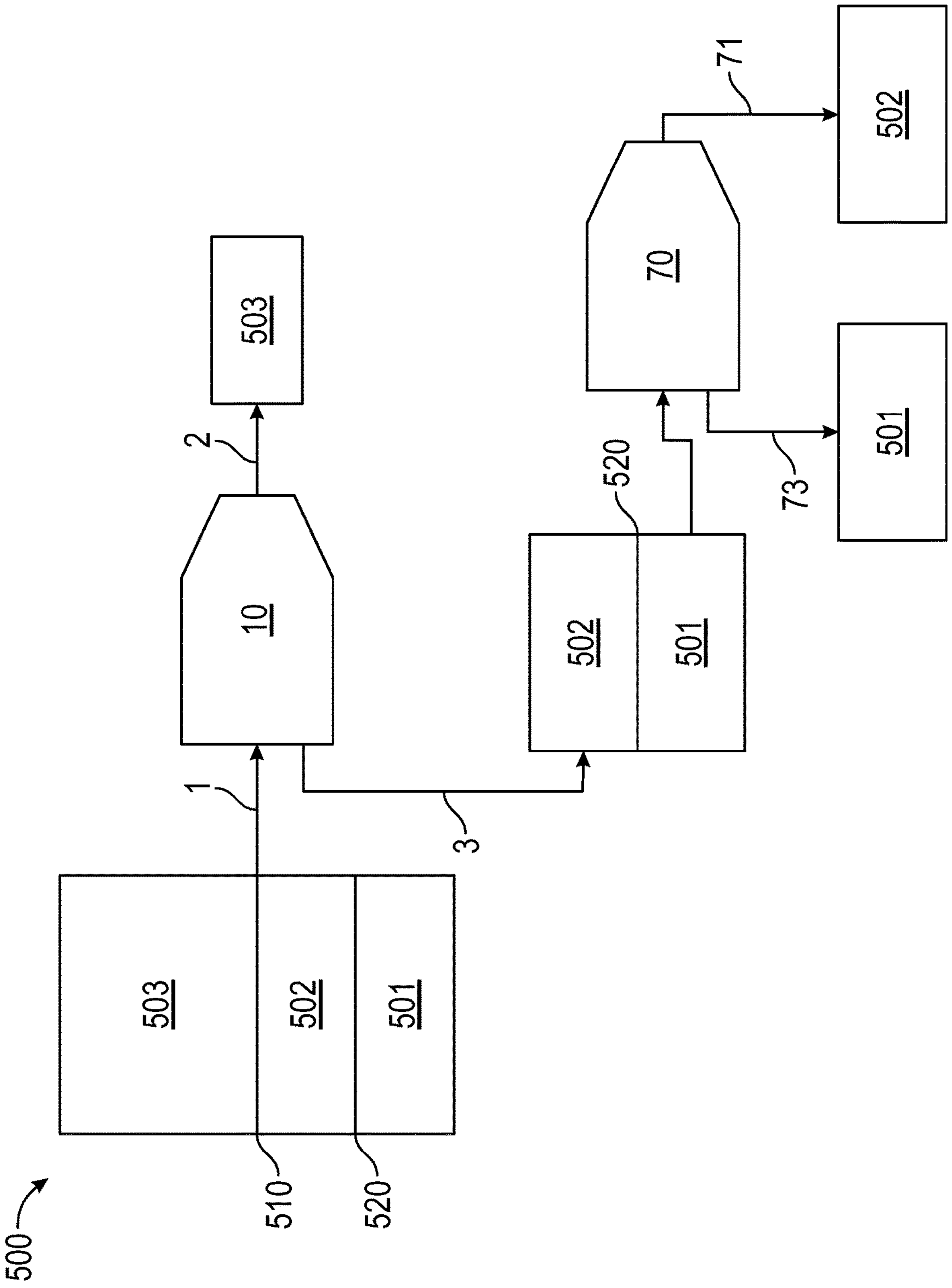
FIG. 1E depicts an embodiment of a system and a method for classification with a solid bowl centrifuge.

FIG. 1E depicts a schematic of an embodiment of a plurality of solids 500, and how the plurality of solids 500 may be processed by the method and system of FIG. 1D. In the embodiment depicted at FIG. 1E, the first cut-off particle size 510 is greater than the second cut-off particle size 520. The plurality of solids 500 of FIG. 1E includes solids 501 having sizes less than or equal to the second cut-off particle size 520, solids 501, 502 having particle sizes less than or equal to the first cut-off particle size 510, and solids 503 having sizes greater than the first cut-off particle size 510. A first stream 1 that includes the plurality of solids 500 is disposed in the first solid bowl centrifuge 10 to achieve classification of the plurality of solids 500 at the first cut-off particle size 510. Therefore, an amount (e.g., at least 50%, at least 55%, at least 65%, at least 75%, at least 85%, at least 95%, at least 99%, by weight, etc.) of the solids 501,502 (or, in some instances, the material of interest) having sizes less than or equal to the first cut-off particle size 510 are present in the first centrate 3, and the solids 501 having sizes greater than the first cut-off particle size 510 are present in the first cake 2. The first centrate 3 is disposed in the second centrifuge 70 to achieve classification of the solids 502,503 at the second cut-off particle size 520. Therefore, an amount (e.g., at least 50%, at least 55%, at least 60%, at least 65%, at least 70%, at least 75%, at least 80%, at least 85%, at least 95%, or at least 99%, by weight, etc.) of the solids 501 having sizes less than or equal to the second particle cut-off size 520 may be present in the second centrate 73, and the solids 502 having sizes greater than the second particle-size cutoff 520 may be present in the second cake 71. The second cake 71 then may be subjected to a valorization procedure, such as any of those described herein, as shown, for example at FIG. 1D (80). Additionally, or alternatively, the second centrate 73 may be subjected to a valorization procedure, such as any of those described herein, as shown, for example at FIG. 1D (80).

Cut-Off Particle Sizes

As explained herein, embodiments of the methods described herein may apply a first cut-off particle size, or a first cut-off particle size and a second cut-off particle size. When a first cut-off particle size and a second cut-off particle size are applied, then the first cut-off particle size may be greater than (e.g., FIG. 1D) or less than (e.g., FIG. 1C) the second cut-off particle size.

Generally, the first cut-off particle size and, if applied, the second cut-off particle size may have any value, and the selected value may depend, for example, on the character of a first plurality of solids of a first stream. In some embodiments, the first cut-off particle size and the second cut-off particle size are independently selected from about 2 μm to about 100 μm, about 2 μm to about 75 μm, about 2 μm to about 50 μm, about 2 μm to about 40 μm, about 2 μm to about 30 μm, about 2 μm to about 20 μm, about 2 μm to about 15 μm, about 2 μm to about 10 μm, about 2 μm to about 5 μm, about 2 μm to about 4 μm, or about 2 μm to about 3 μm. The cut-off particle sizes may be selected independently from any value within these ranges, and the value may be an integer (e.g., 5 μm, 10 μm, 20 μm, etc.) or a non-integer (e.g., 3.5 μm, 5.2 μm, etc.).

In some embodiments, the first cut-off particle size is about 2 μm, about 3 μm, about 4 μm, about 5 μm, about 6 μm, about 7 μm, about 8 μm, about 9 μm, about 10 μm, about 11 μm, about 12 μm, about 13 μm, about 14 μm, about 15 μm, about 16 μm, about 17 μm, about 18 μm, about 19 μm, about 20 μm, about 21 μm, about 22 μm, about 23 μm, about 24 μm, about 25 μm, about 26 μm, about 27 μm, about 28 μm, about 29 μm, about 30 μm, about 31 μm, about 32 μm, about 33 μm, about 34 μm, about 35 μm, about 36 μm, about 37 μm, about 38 μm, about 39 μm, or about 40 μm; and, if applied, the second cut-off particle size is about 2 μm, about 3 μm, about 4 μm, about 5 μm, about 6 μm, about 7 μm, about 8 μm, about 9 μm, about 10 μm, about 11 μm, about 12 μm, about 13 μm, about 14 μm, about 15 μm, about 16 μm, about 17 μm, about 18 μm, about 19 μm, about 20 μm, about 21 μm, about 22 μm, about 23 μm, about 24 μm, about 25 μm, about 26 μm, about 27 μm, about 28 μm, about 29 μm, about 30 μm, about 31 μm, about 32 μm, about 33 μm, about 34 μm, about 35 μm, about 36 μm, about 37 μm, about 38 μm, about 39 μm, or about 40 μm.

In some embodiments, the first cut-off particle size is about 15 μm to about 40 μm, about 15 μm to about 30 μm, or about 18 μm to about 22 μm, and the second cut-off particle size is about 2 μm to about 12 μm, about 2 μm to about 8 μm, about 2 μm to about 6 μm, or about 2 μm to about 4 μm.

In some embodiments, the first cut-off particle size is about 2 μm to about 12 μm, about 2 μm to about 8 μm, about 2 μm to about 6 μm, of about 2 μm to about 4 μm, and the second cut-off particle size is about 15 μm to about 40 μm, about 15 μm to about 30 μm, about 15 μm to about 25 μm, or about 18 μm to about 22 μm.

Pre-Processing of First Stream

A first stream may be any stream, especially a stream that may impart one or more benefits when subjected to classification. Generally, a first stream may be obtained from any source. A first stream may be processed in a raw (as received) form, or a first stream may be processed in some manner prior to being disposed in a first solid bowl centrifuge. For example, a stream, such as a raw stream or any other stream disclosed herein, may be disposed in a thickening device. In some embodiments, a stream is disposed in a thickener to produce a thickener underflow, wherein the first stream includes the thickener underflow.

In some embodiments, the first stream includes a tailings stream. Although a first stream may include a tailings stream, the first stream may include non-waste streams, such as those produced by an upstream process or apparatus. In some embodiments, the first stream includes a flotation feed stream. In some embodiments, the first stream includes a cyclone overflow.

Figure 2:
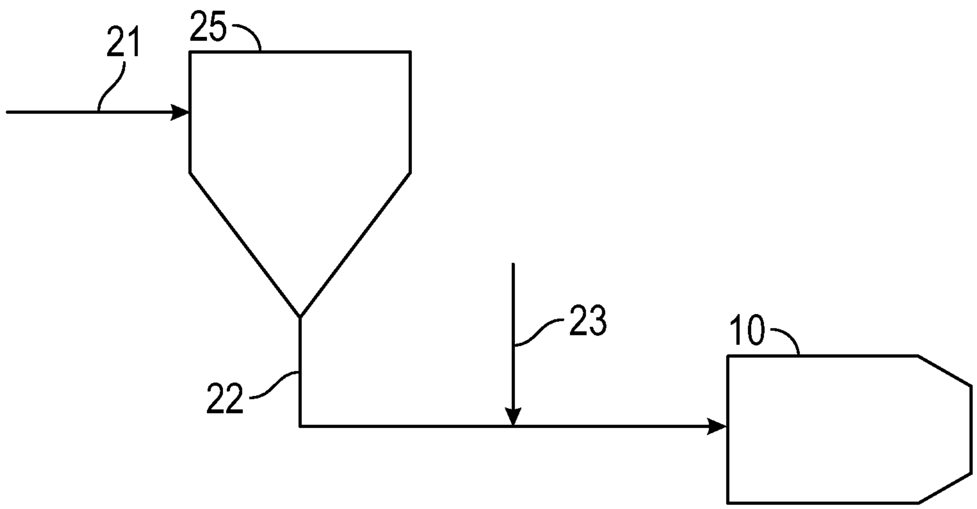
FIG. 2 depicts an embodiment of a system and a method for processing a stream prior to classification.

An embodiment of a system and a method is depicted at FIG. 2. Specifically, FIG. 2 depicts an embodiment of providing a first stream, such as the first stream 1 of FIG. 1A-FIG. 1E. In FIG. 2, a tailings stream 21, such as a washery reject stream, is provided. The waste stream 21 may be disposed in a thickener 25. The thickener underflow 22 of FIG. 2 then is disposed in a solid bowl centrifuge 10, such as the solid bowl centrifuge 10 depicted at FIG. 1A-FIG. 1E. The thickener underflow 22 may be contacted with a chemical additive 23, which may include a dispersant. The chemical additive 23 may be provided by an additive feed, as described herein. Although the additive 23 of FIG. 2 contacts the thickener underflow 22 before the thickener underflow 22 is disposed in the solid bowl centrifuge 10, other configurations are envisioned, as described herein.

Classification

The first solid bowl centrifuge and, if used, the second solid bowl centrifuge of the methods described herein may be the same centrifuge, or two different centrifuges. When the first solid bowl centrifuge and the second solid bowl centrifuge are the same centrifuge, then, optionally, one or more operating parameters of the solid bowl centrifuge may be modified during the processes described herein, such as before the first cake or the first centrate is disposed in the second solid bowl centrifuge. When the first solid bowl centrifuge and the second solid bowl centrifuge are different solid bowl centrifuges, the first and second solid bowl centrifuges may have one or more different operating parameters.

In some embodiments, the methods described herein also include setting and/or adjusting one or more operating parameters of the first solid bowl centrifuge and/or, if used, the second solid bowl centrifuge. The one or more operating parameters may be set and/or adjusted before and/or during the disposing of the first stream in the first solid bowl centrifuge, and/or before and/or during the disposing of the first cake or the first centrate in the second solid bowl centrifuge.

In some embodiments, the adjusting of the one or more operating parameters of the first solid bowl centrifuge and/or, if used, the second solid bowl centrifuge is performed in real time, such as in response to inconsistencies of a stream (e.g., changes in solids concentration, changes in flow rate, etc.) disposed in the first and/or the second solid bowl centrifuge. The one or more operating parameters include bowl speed, feed flowrate, differential speed, etc. (see Examples 1-8).

In some embodiments, targeted classification of ultra fine material at a desired cut-off particle size may require fine control of the centrifugal G-force and flow regime. The optimal flow conditions (where flow conditions determine residence time of solids and liquid) may vary with feed material characteristics, as the settling properties of the materials may vary with mineral density, particle size distribution, particle shape factor, zeta potential, and/or one or more surface properties, such as hydrophobicity. The variable particle settling behavior also can lead to hindered settling, wherein the smaller/lighter particles can impede the path and slow the settling of the larger/heavier particles and can also be trapped within a formed cake.

The operating variables of a solid bowl centrifuge may allow control of the centrifugal G-force and flow regime that a feed material (e.g., first stream, first cake, or first centrate) is subjected to, thereby providing at least some control over the settling rate, the proportion of solids recovered to cake, the proportion of water recovered to cake, and/or the cut-off particle size at which separation occurs. Variables affecting classification performance can include the following: bowl speed, weir height, and differential speed, plus one or more feed variables, such as volumetric flow rate and/or solids concentration. Targeted classification can require control over these variables to achieve the desired cut point for a given material.

For example, increasing the feed flow rate can increase the axial flow velocity, thereby reducing the residence time and increasing turbulence, which can impact settling time, particularly for smaller sized fractions. To counteract this effect, a pond depth can be increased (e.g., controlled via the weir height) to increase residence time, but this can increase the tangential velocity differential between the bowl wall and the pond surface, which may result in an increase in the time taken for a material to accelerate to the angular velocity of the bowl.

Also, increasing bowl speed can increase the G-force that solids are subjected to, but doing so may also lead to a larger tangential velocity gradient within the fluid; therefore, the feed solids near a pond surface may take longer to accelerate to the angular velocity of the bowl. Increasing the pond depth may decrease bulk mean axial flow velocity, thereby increasing residence time. Increasing pond depth also may allow an increase in the volumetric feed rate, thereby reducing the effective residence time, as the solids transit further in the axial direction before reaching the angular velocity of the bowl. Particles near the pond surface may be subjected to a lower centrifugal force, and, therefore, will take even longer to settle to the bowl wall. The combination of this effect and the longer acceleration period can reduce solids recovery of ultra-fines around the targeted cutpoint.

Material of Interest

The material of interest that is present in a first stream may include any material, especially a material of value.

Non-limiting examples of materials of interest include a phosphorus-containing compound, a native metal, a metal-containing compound, a mineral, etc.

The phosphorus-containing compound may include phosphate, a phosphorus oxide, or combination thereof. For example, the phosphorus-containing compound may include bone phosphate of lime, phosphorus pentoxide, etc. The phrase "bone phosphate of lime" is a well-known term of art, which is generally understood to refer to and include tricalcium phosphate (TCP) ($Ca_3(PO_4)_2$) (which is commonly known as "calcium phosphate"). Therefore, the phrase "bone phosphate of lime" may refer to and include carbonateapatite [$3Ca_3(PO_4)_2 \cdot CaCO_3$], fluorapatite [$3Ca_3(PO_4)_2 \cdot CaF2$], hydroxyapatite [$3Ca_3(PO_4)_2 \cdot Ca(OH)_2$], sulphoapatite [$3Ca_3(PO_4)_2 \cdot CaSO_4$], or a heterogeneous residual mixture thereof.

The metal may include one or more platinum group metals (PGM), such as "4e PGM" (platinum, palladium, rhodium, and gold), or 6e PGM (platinum, palladium, rhodium, ruthenium, osmium, and iridium). The metal may include ruthenium, rhodium, palladium, osmium, iridium, platinum, copper, iron, or a combination thereof.

The metal-containing compound may include a metal oxide, a metal carbonate, or a combination thereof. The metal oxide may include iron oxide. The mineral may include gypsum.

Valorization Procedures

The valorization procedures applied in the methods described herein may include any of those known in the art or any of those described herein.

Due to a classification achieved by a first solid bowl centrifuge or a dual classification achieved by a first solid bowl centrifuge and a second solid bowl centrifuge, as described herein, one or more elements (e.g., product recovery, throughput capacity, grade, etc.) of a valorization procedure may be improved compared to an identical valorization procedure applied to a first stream that is not classified (e.g., deslimed) by one or more solid bowl centrifuges. Not wishing to be bound by any particular theory, it is believed, in some instances, that removing certain ultra-fine solids, such as ultra-fine talc, can lead to a surprising and unexpected improvement of a valorization process.

For example, in some embodiments, a valorization procedure recovers in a product stream at least 5%, at least 10%, at least 15%, at least 20%, at least 25%, at least 30%, at least 35%, at least 40%, at least 45%, or at least 50%, by weight, more of the material of interest that is present in the first stream than an identical valorization procedure performed directly on the first stream (i.e., without disposing the first stream in a first and/or second solid bowl centrifuge).

Additionally, or alternatively, in some embodiments, a valorization procedure has a throughput capacity that is at least 20%, at least 30%, or at least 40% greater (without a loss of performance) than an identical valorization procedure performed directly on the first stream (i.e., without disposing the first stream in a solid bowl centrifuge).

Additionally or alternatively, in some embodiments, a valorization procedure achieves an uplift in grade of the material of interest of at least 4 percentage points, at least 6 percentage points, or at least 10 percentage points relative to an identical valorization procedure performed directly on the first stream.

In some embodiments, the valorization procedure includes a physical procedure, a chemical procedure, or a combination thereof. The valorization procedure may include a beneficiation procedure. Non-limiting examples of valorization procedures include a flotation procedure, a leaching procedure (e.g., alkali tank leaching), a magnetic separation procedure (e.g., a wet, low intensity magnetic separation (WLIMS), a wet, high intensity magnetic separation (WHIMS)), other separation procedures, a refining procedure (e.g., a refining hydrometallurgical procedure), a smelting procedure, etc.

The methods provided herein may include reducing an average particle size of solids in a stream subjected to a valorization procedure. For example, the methods may include reducing an average particle size of (i) the second plurality of solids of the first cake, and/or (ii) the fourth plurality of solids of the second cake, and this process may occur before the first cake, or the second cake is subjected to a valorization procedure. The reducing of the average particle size may be achieved using any known technique, such as milling (e.g., ball milling, jet milling, etc.), grinding, etc.

In some embodiments, the valorization procedure includes a flotation procedure. The flotation procedure may include (i) reverse flotation, (ii) direct flotation, (iii) reverse flotation and direct flotation (in any order), (iv) a first direct flotation and a second direct flotation, or (v) a first reverse flotation and a second reverse flotation. In such cases the flotation apparatuses used may vary.

In some embodiments, a product stream, after a flotation procedure, does not include—or includes a reduced amount of (relative to the stream subjected to the flotation procedure (e.g., first cake, first centrate, second cake, or second centrate)—gangue minerals, such as mineral carbonates (containing Ca, Mg, Fe, and/or Mn), mineral silicates that may include Mg, silica, talc, dolomite, or a combination thereof.

In some embodiments, the flotation procedure includes contacting the first cake or the second cake and a liquid to produce a diluted cake; subjecting the diluted cake to reverse flotation to produce a first froth and a second stream including an underflow of the reverse flotation, wherein the second stream includes a first amount of the material of interest; and subjecting the second stream to direct flotation to produce a second froth product and a second stream including an underflow of the direct flotation; wherein the second froth is the product stream, which includes at least a portion of the material of interest.

When a cake (e.g., first cake or second cake) is diluted, the cake may be diluted to any desired extent. In some embodiments, (i) the second plurality of solids of the first cake or (ii) the fourth plurality of solids of the second cake is present in a diluted cake at a concentration of about 10% to about 30%, about 15% to about 30%, about 15% to about 25%, or about 15% to about 20%, by weight, based on the weight of the diluted cake.

In some embodiments, the first froth includes at least 50%, at least 60%, at least 70%, or at least 80%, or at least 90%, by weight, of gangue minerals (flow through) present in the first cake or the second cake. In some embodiments, (A) the first froth includes at least 50%, at least 60%, at least 70%, or at least 80%, or at least 90%, by weight, of carbonates present in the first cake or the second cake; (B) the second stream includes at least 50%, at least 60%, at least 70%, or at least 80%, or at least 90%, by weight, of silica present in the first cake, the second cake, the first froth, or the first underflow; or (C) a combination thereof.

Prior to and/or during reverse flotation, the methods may include contacting a first cake, a second cake, or a diluted cake and (i) an agent effective for maintaining a desired pH, (ii) a collector (which may be an organic collector or an inorganic collector), such as a carbonate collector, or (iii) a combination thereof. The agent effective for maintaining the desired pH may be an acid. The agent effective for making selected minerals (e.g., undesired gangue minerals) hydrophilic may be a depressant, such as an apatite depressant, which may include $H_3PO_4$. A desired pH may be any pH that positively impacts the flotation of a selected mineral (e.g., gangue mineral or mineral of interest). The pH may be alkaline or acidic. In some embodiments, the pH is less than 7, such as about 5 to about 6.5, about 5 to about 6, or about 5 to about 5.5. The carbonate collector may adhere to surfaces of carbonates, such as calcite, dolomite, etc. The second stream, prior to the direct flotation, may be contacted with a pH modifier, a depressant, a collector, or a combination thereof.

The second stream, prior to and/or during direct flotation, may be contacted with (i) a depressant (e.g., a gangue mineral depressant), (ii) a pH modifier to maintain a desired pH, (iii) a collector (e.g., a value mineral collector), (iv) a frother, or (v) a combination thereof. The depressant may include $Na_2SiO_3$. The pH modifier and/or the depressant may be $Na_2CO_3$. The pH modifier may be NaOH. The desired pH may be about 9 to about 10, or about 9 to about 9.5.

Figure 3:
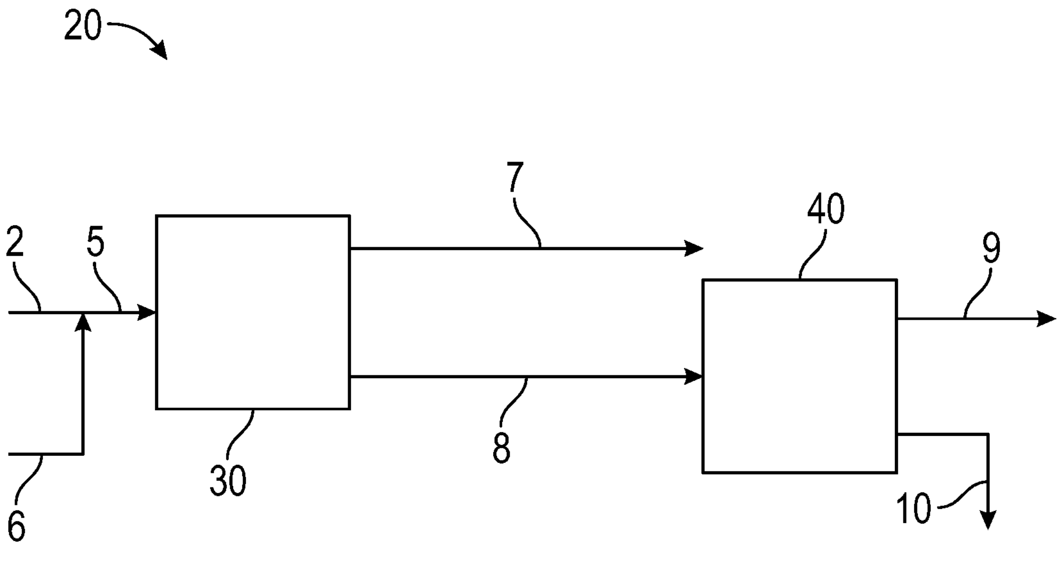
FIG. 3 depicts an embodiment of a system and an embodiment of a method of flotation.

An embodiment of a system and a method is depicted at FIG. 3. Specifically, FIG. 3 depicts an embodiment of a valorization procedure, which, in the embodiment of FIG. 3, is a flotation procedure. As depicted at FIG. 3, a first cake 2 (see, e.g., FIG. 1A) is contacted with a diluting liquid 6 to form a diluted cake 5. Although the first cake 2 of FIG. 1A is depicted at FIG. 3, the method of FIG. 3 may be applied to the first centrate 3 of FIG. 1A, the second cake 71 of FIG. 1B-FIG. 1E, or the second centrate 72 of FIG. 1B-FIG. 1E. The diluting liquid 6 may be provided by a liquid feed, as described herein. The diluted cake 5 of FIG. 3 may be subjected to reverse flotation 30. Prior to and/or during the reverse flotation 30, the diluted cake 5 may be contacted with (i) an agent effective for maintaining a desired pH, (ii) a collector, such as a carbonate collector, or (iii) a combination thereof. The reverse flotation 30 may form a first froth 7 and a second stream 8 that includes the underflow of the reverse flotation 30. The first froth 7 may include at least 50%, at least 60%, at least 70%, or at least 80%, or at least 90%, by weight, of carbonates present in the first cake 2 or diluted cake 5. The second stream 8 may be subjected to direct flotation 40, which results in a second froth 9 and a third stream 10 that includes the underflow of the direct flotation 40. The third stream 10 may include at least 50%, at least 60%, at least 70%, or at least 80%, or at least 90%, by weight, of silica present in the first cake 2 or diluted cake 5. Although not depicted at FIG. 3, the second froth 9 may be disposed in a thickener. Prior to and/or during the direct flotation 40, the second stream 8 may be contacted with (i) a depressant (e.g., a gangue mineral depressant), (ii) a pH modifier to maintain a desired pH, (iii) a collector (such as a value mineral collector), (iv) a frother, or (v) a combination thereof. Although not depicted at FIG. 3, one or more feeds may provide any of the foregoing materials, such the collectors, depressants, pH modifiers, etc.

Characteristics and Processing of the Second Stream

The second stream produced by reverse flotation generally may include any percentage of the solids present in the input stream (e.g., first cake, second cake, diluted cake, first centrate, or second centrate). In some embodiments, about 60% to about 80%, about 65% to about 75%, or about 70% to about 75%, by weight, of the second plurality of solids of the first cake (or the third plurality of solids of the first centrate, or the fourth plurality of solids or the fifth plurality of solids of the second cake or second centrate, respectively) is present in the second stream. In some embodiments, the second stream has a solids content of about 10% to about 25%, about 10% to about 20%, or about 15% to about 20%, by weight, based on the weight of the second stream.

In some embodiments, a second stream is diluted prior to the direct flotation. After the diluting, the second stream may have a solids content of about 10% to about 25%, about 10% to about 20%, about 10% to about 15%, or about 15% to about 20%, by weight, based on the weight of the second stream.

Characteristics of the Second Froth

A second froth produced by direct flotation generally may have any solids content. For example, the second froth may have a solids content of about 10% to about 25%, about 10% to about 20%, or about 10% to about 15%, by weight, based on the weight of the second froth.

In some embodiments, about 65% to about 85%, about 65% to about 75%, or about 70% to about 75%, by weight, of solids present in the second stream are present in the second froth. In some embodiments, about 70% to about 90%, or about 80% to about 85%, by weight, of the material of interest present in the second stream is present in the second froth.

Global Recovery

In some embodiments, at least 20%, at least 30%, at least 40%, at least 50%, at least 60%, at least 70%, at least 80%, or at least 90%, by weight, of the first plurality of solids of the first stream is present in the product stream (e.g., the second froth).

In some embodiments, at least 20%, at least 30%, at least 40%, at least 50%, at least 60%, at least 70%, at least 80%, or at least 90%, by weight, of the material of interest of the first stream is present in the product stream (e.g., the second froth).

Treatment of Product Streams, Froths, Underflows, and Centrates

Any or all of the streams obtained by the methods described herein may be processed in any known manner at any points of the methods described herein.

In some embodiments, the methods include modifying a concentration of solids in a stream (e.g., an underflow, an overflow (e.g., a froth), a first centrate, a second centrate, etc.) between steps (e.g., between classification and valorization, between reverse flotation and direct flotation, etc.), wherein the modifying of the concentration of solids may include thickening the stream.

A product stream, for example, may be processed in any manner that facilitates or cases the isolation of a portion of the material of interest. In some embodiments, the methods include disposing a product stream in a thickener. In some embodiments, the methods include disposing the first centrate, the second centrate, the first froth, the second stream, or a combination thereof in a thickener. In some embodiments, the methods include collecting an overflow of the thickener. The overflow of a thickener may include clarified water. An underflow from a thickener may be processed with a dewatering apparatus, and, optionally, the underflow from the thickener may be contacted with one or more additives before, during, and/or after disposing the underflow from the thickener in the dewatering apparatus. The dewatering apparatus may include a centrifuge. In some embodiments, the dewatering apparatus includes a belt press filter, a horizontal belt vacuum filter, a rotary vacuum drum, a rotary vacuum disc filter, a screen bowl centrifuge, a deep cone/paste thickener, a membrane filter press, a solid bowl centrifuge other than the first and second solid bowl centrifuge of any of the preceding embodiments. The dewatering apparatus may produce a cake and a centrate, and water may be recovered from the centrate.

Figure 4:
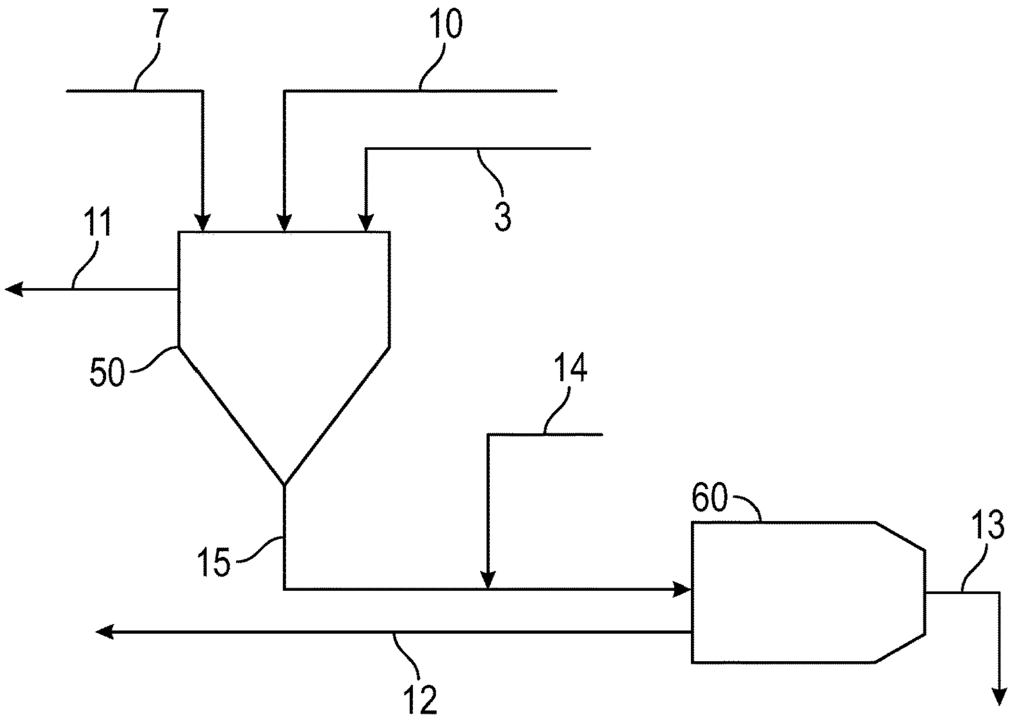
FIG. 4 depicts an embodiment of a system and a method for processing one or more streams with a thickener and a dewatering apparatus, such as a solid bowl centrifuge.

An embodiment of a system and a method is depicted at FIG. 4. As depicted at FIG. 4, one or more of the first froth 7 of FIG. 3, the third stream 10 of FIG. 3, and the first centrate 3 of FIG. 1A (or the second centrate 72 of FIG. 1B-FIG. 1E) may be disposed in a thickener 50. The overflow of the thickener 50 may be (or include) clarified water 11. The underflow of the thickener 15 may be contacted with an additive, such as a flocculant 14, and disposed in a dewatering apparatus, such as a centrifuge 60. The centrifuge may produce a cake 13. The cake 13 may be discarded. The centrifuge 60 may produce a centrate 12 that may include water. The centrate 12 may be combined with the clarified water 11. Although the dewatering apparatus depicted in the embodiment of FIG. 4 is a centrifuge 60, other dewatering apparatuses, such as those described herein, may be used.

Characteristics of First Stream

The first plurality of solids may be present in the first stream at any amount or concentration. In some embodiments, the first plurality of solids is present in the first stream at a concentration of about 10% to about 60%, about 10% to about 50%, about 15% to about 45%, about 20% to about 40%, about 25 to about 35%, or about 30%, by weight, based on the weight of the first stream.

The first plurality of solids of the first stream generally may have any sizes and shapes. In some embodiments, the first plurality of solids includes particles having sizes less than 100 μm. In some embodiments, the first plurality of solids that is present in the first stream has a particle size distribution within any one or more of the following weight percentage ranges for any one or more of the particle sizing limits:

| Particle Sizing | Wt % of the plurality of solids |
|---|---|
| Cumulative passing 100 μm % | about 70 to 99, about 75 to about 95, about 80 to about 95, about 85 to about 95, or about 85 to about 90 |
| Cumulative passing 40 μm % | about 45 to about 80, about 50 to about 75, about 55 to about 75, about 60 to about 70, or about 65 |
| Cumulative passing 25 μm % | about 45 to about 75, about 50 to about 70, about 55 to about 65, about 60 to about 65, or about 60 |
| Cumulative passing 20 μm % | about 40 to about 65, about 40 to about 60, about 45 to about 55, about 50 to about 55, or about 52 |
| Cumulative passing 10 μm % | about 30 to about 50, about 35 to about 45, about 38 to about 42, or about 40 |
| Cumulative passing 4 μm % | about 10 to about 30, about 15 to about 25, about 15 to about 20, about 20 to about 25, or about 20 |
| Cumulative passing 2 μm % | about 5 to about 25, about 5 to about 20, about 5 to about 15, about 5 to about 10, about 10 to about 15, or about 10 |

Characteristics and Processing of Cakes and Centrates

In some embodiments, the first cake and/or the second cake is a coarse particle stream. Solids generally may be present in the first cake and/or the second cake at any amount or concentration.

In some embodiments, the first portion of the first plurality of solids of the first stream is present in the first cake at a concentration of about 60% to about 95%, about 60% to about 90%, about 60% to about 85%, about 60% to about 80%, about 65% to about 75%, or about 70%, by weight, based on the weight of the first cake.

In some embodiments, the second plurality of solids of the first cake has a particle size distribution within any one or more of the following weight percentage ranges for any one or more of the particle sizing limits:

| Particle Sizing | Wt % of the first portion of the plurality of solids |
|---|---|
| Cumulative passing 100 μm % | about 65 to about 98, about 70 to about 95, about 70 to about 90, about 75 to about 85, or about 80 |
| Cumulative passing 40 μm % | about 3 to about 60, about 10 to about 60, about 20 to about 60, about 30 to about 50, about 35 to about 45, about 40 to about 45, or about 40 |
| Cumulative passing 20 μm % | about 15 to about 40, about 15 to about 35, about 15 to about 30, about 20 to about 30, or about 25 |
| Cumulative passing 10 μm % | about 3 to about 25, about 5 to about 20, about 10 to about 20, or about 15 |

In some embodiments, the third plurality of solids of the first centrate has a particle size distribution within any one or more of the following weight percentage ranges for any one or more of the particle size limits:

| Particle Sizing | Wt % of the second portion of the plurality of solids |
|---|---|
| Cumulative passing 100 μm % | about 85 to about 100, about 90 to about 100, about 95 to about 100, or about 98 to about 100 |
| Cumulative passing 40 μm % | about 80 to about 100, about 85 to about 100, about 90 to about 100, or about 95 to about 100 |
| Cumulative passing 20 μm % | about 75 to about 100, about 80 to about 100, about 85 to about 95, or about 85 to about 90 |
| Cumulative passing 10 μm % | about 65 to about 90, about 65 to about 85, about 70 to about 85, about 70 to about 80, or about 70 to about 75 |

In some embodiments, the second plurality of solids, the third plurality of solids, the fourth plurality of solids, and/or the fifth plurality of solids includes at least 50%, at least 60%, at least 70%, at least 80%, or at least 90%, by weight, of the material of interest that is present in the first stream (in other words, at least 50%, at least 60%, at least 70%, at least 80%, or at least 90%, by weight, of the material of interest that is present in the first stream is recovered).

Additives

Any of the streams of the methods described herein may be contacted with one or more additives. In some embodiments, the methods include contacting (i) a first stream and one or more additives before, during, and/or after the disposing of the first stream in the first solid bowl centrifuge, (ii) a first cake and one or more additives before, during, and/or after the disposing of the first cake in a second solid bowl centrifuge, (iii) a first centrate and one or more additives before, during, and/or after the disposing of the first centrate in the second solid bowl centrifuge, or (iv) a combination thereof.

The methods provided herein may include the use of one or more additives. In some embodiments, one or more additives are selected from the group consisting of a flocculant, a coagulant, a conditioner, a dispersant, and a surfactant. Therefore, the one or more additives may include a flocculant, a coagulant, a conditioner, a dispersant, a surfactant, or a combination thereof.

In some embodiments, the one or more additives includes a dispersant. Any known dispersant may be used in the methods described herein.

In some embodiments, the one or more additives includes a flocculant. In some embodiments, the flocculant is a non-ionic flocculant. In some embodiments, the flocculant is an anionic flocculant. In some embodiments, the flocculant is a cationic flocculant. In some embodiments, the flocculant is a fatty acid/lipid flocculant. In some embodiments, the flocculant is a polymeric flocculant, which includes a polymer, such as an acrylic polymer (e.g., a polyacrylamide), a polyethylene oxide, a polysaccharide (e.g., natural starches and gums), poly (diallyl dimethyl-ammonium chloride), etc. When the flocculant is a polymeric flocculant, the polymer may be a high molecular weight polymer (i.e., a polymer having an Mw of at least 100,000 g/mol), or a very high molecular weight polymer (i.e., a polymer having an Mw of at least 10,000,000 g/mol). In some embodiments, the flocculant is a non-ionic polymeric flocculant. In some embodiments, the flocculant is a non-ionic high or very high molecular weight polymeric flocculant. In some embodiments, the flocculant is an anionic polymeric flocculant. In some embodiments, the flocculant is an anionic high or very high molecular weight polymeric flocculant. In some embodiments, the flocculant is a cationic polymeric flocculant. In some embodiments, the flocculant is a cationic high or very high molecular weight polymeric flocculant. In some embodiments, the flocculant is a commercially available flocculant.

An additive, such as a dispersant, flocculant, etc., may be in any form prior to its use in the methods provided herein. An additive, for example, may be in the form of a powder prior to its use in the methods provided herein. The powder may include a plurality of particles having any shape or size. In some embodiments, less than 2% of the particles of a powder are retainable with a 20-mesh woven wire screen, a 25-mesh woven wire screen, a 30-mesh woven wire screen, or a 35-mesh woven wire screen.

An additive, such as a dispersant or flocculant in the form of a powder, may be combined with a liquid, typically clean water, prior to its use in the methods provided herein. An additive may dissolve completely or partially in the liquid. In some embodiments, an additive is in the form of a powder, and the powder is combined with clean water to form a combination. A pH of the water may be modified, if necessary or desirable, prior to disposing an additive in the water. The selection of a pH that increases the ionic character of an additive may permit the use of a lower dose rate of the additive. Commercially available additives can include liquids in which an additive is disposed; therefore, in some embodiments, the methods herein include providing a liquid in which an additive powder is disposed.

When used, an additive may be used at any amount or concentration that achieves a desired effect. In some embodiments, a first stream, a first cake (or a stream that includes the first cake), and/or a first centrate (or a stream that includes a first centrate) is contacted with the additive, such as a dispersant, at an amount of about 1 gram to about 500 grams, about 100 grams to about 500 grams, about 200 grams to about 500 grams, about 250 grams to about 500 grams, about 1 gram to about 400 grams, about 1 gram to about 300 grams, about 1 gram to about 200 grams, about 1 gram to about 150 grams, about 1 gram to about 100 grams, about 1 gram to about 75 grams, about 1 gram to about 50 grams, about 1 gram to about 40 grams, about 1 gram to about 30 grams, about 1 gram to about 20 grams, or about 1 gram to about 10 grams of the dispersant per dry tonne of the solids content of the first stream, first cake, and/or first centrate, wherein the foregoing amounts are amounts of additive only (e.g., dispersant only), and do not include a non-additive liquid (e.g., a non-dispersant liquid), such as water, with which a dispersant may be combined.

Systems

Also provided herein are systems, which may be used to perform any of the methods described herein.

In some embodiments, the systems include a first solid bowl centrifuge, and a valorization (e.g., beneficiation) apparatus. In some embodiments, the systems include a first solid bowl centrifuge, a second solid bowl centrifuge, and a valorization (e.g., beneficiation) apparatus. The valorization apparatus may be configured to receive a cake (e.g., first cake or second cake) from the first or the second solid bowl centrifuge, a diluted cake (e.g., a stream includes the first cake or the second cake) from the first or the second solid bowl centrifuge, or a first or a second centrate from the first or the second solid bowl centrifuge, respectively.

The system may include one or more apparatuses for processing a stream, as described herein. In some embodiments, the methods include a first thickener, such as a first thickener configured to (i) receive a stream, such as a tailings stream, (ii) provide a first thickener underflow to the first solid bowl centrifuge, or (iii) a combination thereof.

The system also may include one or more feeds, which, for example, may be configured to contact a stream with an additive. In some embodiments, the systems include a first additive feed, such as a first additive feed configured to contact a stream (such as a stream comprising the first thickener underflow) disposed in the first solid bowl centrifuge and/or the second solid bowl centrifuge with an additive described herein, such as a dispersant. The one or more feeds may include one or more liquid feeds, such as a liquid feed configured to contact a liquid and a cake produced by the first and/or second solid bowl centrifuge to produce a diluted cake, such as a diluted first cake or a diluted second cake.

The valorization apparatus of the systems provided herein may include a flotation apparatus, which may include a reverse flotation apparatus (e.g., one or more reverse flotation apparatuses), a direct flotation apparatus (e.g., one or more direct flotation apparatuses), or a combination thereof. A reverse flotation apparatus may be configured to receive a first cake, a second cake, a diluted first cake, or a diluted second cake from the first or the second solid bowl centrifuge, and a direct flotation apparatus may be configured to receive a stream comprising an underflow from the reverse flotation apparatus.

In some embodiments, the systems include a second thickener, wherein the second thickener may be configured to receive one or more streams from (i) the valorization apparatus (such as a froth from the reverse flotation apparatus and/or an underflow from the direct flotation apparatus), (ii) the first and/or the second solid bowl centrifuge (such as a stream comprising a first or a second centrate of the first or the second solid bowl centrifuge, respectively), or (iii) a combination thereof.

In some embodiments, the methods may include a dewatering apparatus, wherein the dewatering apparatus may be configured to receive an underflow from a thickener, such as a second thickener, as described herein. The dewatering apparatus may include a belt press filter, a horizontal belt vacuum filter, a rotary vacuum drum, a rotary vacuum disc filter, a screen bowl centrifuge, a deep cone/paste thickener, a membrane filter press, a solid bowl centrifuge other than the first and/or the second solid bowl centrifuge. In some embodiments, the methods include a second additive feed, such as a second additive feed configured to contact a stream (such as a stream comprising the second thickener underflow) disposed in the dewatering apparatus with an additive described herein, such as a flocculant.

While certain aspects of conventional technologies have been discussed to facilitate disclosure of various embodiments, applicants in no way disclaim these technical aspects, and it is contemplated that the present disclosure may encompass one or more of the conventional technical aspects discussed herein.

The present disclosure may address one or more of the problems and deficiencies of known methods and processes. However, it is contemplated that various embodiments may prove useful in addressing other problems and deficiencies in a number of technical areas. Therefore, the present disclosure should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

In the descriptions provided herein, the terms "includes," "is," "containing," "having," and "comprises" are used in an open-ended fashion, and thus should be interpreted to mean "including, but not limited to." When methods or systems are claimed or described in terms of "comprising" various steps or components, the methods or systems can also "consist essentially of" or "consist of" the various steps or components, unless stated otherwise.

The terms "a," "an," and "the" are intended to include plural alternatives, e.g., at least one. For instance, the disclosure of "a dispersant," "a first stream," "an underflow", and the like, is meant to encompass one, or mixtures or combinations of more than one dispersant, first stream, underflow, and the like, unless otherwise specified.

Various numerical ranges may be disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. Moreover, all numerical end points of ranges disclosed herein are approximate. As a representative example, Applicant discloses, in some embodiments, a plurality of solids is present in a first stream at a concentration of about 25% to about 35%. This range should be interpreted as encompassing about 25% and about 35%, and further encompasses "about" each of 26%, 27%, 28%, 29%, 30%, 31%, 32%, 33%, and 34%, including any ranges and sub-ranges between any of these values.

As used herein, the term "about" means plus or minus 10% of the numerical value of the number with which it is being used.

EMBODIMENTS

The following is a non-limiting list of embodiments of the methods and systems described herein:

Embodiment 1. A method of classification and recovery, the method comprising (consisting essentially of, or consisting of): providing a first stream comprising, consisting essentially of, or consisting of a first plurality of solids, wherein the first plurality of solids comprises, consists essentially of, or consists of a material of interest; wherein a first portion of the first plurality of solids has sizes greater than a first cut-off particle size, and a second portion of the first plurality of solids has sizes less than or equal to a first cut-off particle size; and disposing the first stream in a first solid bowl centrifuge to produce (i) a first cake comprising, consisting essentially of, or consisting of a second plurality of solids, the second plurality of solids comprising, consisting essentially of, or consisting of at least 50%, at least 55%, at least 60%, at least 65%, at least 70%, at least 75%, at least 80%, at least 85%, at least 95%, or at least 99%, by weight, of the first portion of the first plurality of solids, and (ii) a first centrate comprising, consisting essentially of, or consisting of a third plurality of solids, the third plurality of solids comprising, consisting essentially of, or consisting of at least 50%, at least 55%, at least 60%, at least 65%, at least 70%, at least 75%, at least 80%, at least 85%, at least 95%, or at least 99%, by weight, of the second portion of the first plurality of solids.

Embodiment 2. The method of embodiment 1, further comprising, consisting essentially of, or consisting of subjecting the first cake or the first centrate to a valorization procedure to produce a product stream comprising at least a portion of the material of interest.

Embodiment 3. The method of embodiment 1 or 2, further comprising, consisting essentially of, or consisting of: disposing the first cake in a second solid bowl centrifuge to produce (a) a second cake comprising, consisting essentially of, or consisting of a fourth plurality of solids, and (b) a second centrate comprising, consisting essentially of, or consisting of a fifth plurality of solids; and subjecting the second cake or the second centrate to a valorization procedure to produce a product stream comprising at least a portion of the material of interest; wherein a first portion of the second plurality of solids of the first cake has sizes greater than a second cut-off particle size, and a second portion of second plurality of solids of the first cake has sizes less than or equal to a second cut-off particle size; wherein the fourth plurality of solids of the second cake comprises, consists essentially of, or consists of at least 50%, at least 55%, at least 60%, at least 65%, at least 70%, at least 75%, at least 80%, at least 85%, at least 95%, or at least 99%, by weight, of the first portion of the second plurality of solids; and wherein the fifth plurality of solids of the second centrate comprises, consists essentially of, or consists of at least 50%, at least 55%, at least 60%, at least 65%, at least 70%, at least 75%, at least 80%, at least 85%, at least 95%, or at least 99%, by weight, of the second portion of the second plurality of solids.

Embodiment 4. The method of any one of embodiments 1 to 3, further comprising, consisting essentially of, or consisting of: (C) disposing the first centrate in a second solid bowl centrifuge to produce (a) a second cake comprising, consisting essentially of, or consisting of a fourth plurality of solids, and (b) a second centrate comprising, consisting essentially of, or consisting of a fifth plurality of solids; and subjecting the second cake or the second centrate to a valorization procedure to produce a product stream comprising at least a portion of the material of interest; wherein a first portion of the third plurality of solids of the first centrate has sizes greater than a second cut-off particle size, and a second portion of third plurality of solids of the first centrate has sizes less than or equal to a second cut-off particle size; wherein the fourth plurality of solids of the second cake comprises, consists essentially of, or consists of at least 50%, at least 55%, at least 60%, at least 65%, at least 70%, at least 75%, at least 80%, at least 85%, at least 95%, or at least 99%, by weight, of the first portion of the third plurality of solids; and wherein the fifth plurality of solids comprising, consisting essentially of, or consisting of at least 50%, at least 55%, at least 60%, at least 65%, at least 70%, at least 75%, at least 80%, at least 85%, at least 95%, or at least 99%, by weight, of the second portion of the third plurality of solids.

Embodiment 5. A method of classification and recovery, the method comprising (consisting essentially of, or consisting of): (A) providing a first stream comprising a plurality of solids, wherein the plurality of solids comprises, consists essentially of, or consists of a material of interest; and disposing the first stream in a solid bowl centrifuge to produce (i) a first cake comprising, consisting essentially of, or consisting of a first portion of the plurality of solids, and (ii) a second stream comprising, consisting essentially of, or consisting of a centrate; or (B) providing a first stream comprising a plurality of solids, wherein the plurality of solids comprises, consists essentially of, or consists of a material of interest; disposing the first stream in a solid bowl centrifuge to produce (i) a first cake comprising, consisting essentially of, or consisting of a first portion of the plurality of solids, and (ii) a second stream comprising, consisting essentially of, or consisting of a centrate; and subjecting the first cake to a valorization procedure to produce a product stream comprising the material of interest; (C) providing a first stream comprising a plurality of solids, wherein the plurality of solids comprises, consists essentially of, or consists of a material of interest; disposing the first stream in a first solid bowl centrifuge to produce (i) a first cake comprising, consisting essentially of, or consisting of a first portion of the plurality of solids, and (ii) a second stream comprising, consisting essentially of, or consisting of a first centrate; disposing a stream comprising, consisting essentially of, or consisting of the first cake in a second solid bowl centrifuge to produce (i) a second cake comprising a second portion of the plurality of solids, and (ii) a third stream comprising, consisting essentially of, or consisting of a second centrate; and optionally subjecting the second cake to a valorization procedure to produce a product stream comprising the material of interest; or (D) providing a first stream comprising a plurality of solids, wherein the plurality of solids comprises, consists essentially of, or consists of a material of interest; disposing the first stream in a solid bowl centrifuge to produce (i) a first cake comprising, consisting essentially of, or consisting of a first portion of the plurality of solids, and (ii) a second stream comprising, consisting essentially of, or consisting of a centrate; and subjecting the first cake to a beneficiation procedure, such as a flotation procedure or other separation procedure (e.g., a wet, low intensity magnetic separation (WLIMS) or a wet, high intensity magnetic separation (WHIMS)), to produce a product stream comprising the material of interest.

Embodiment 6. The method of embodiment 5, (i) wherein the weight percent of the first portion of the plurality of solids having a particle size less than the cut-off particle size is at least 5, at least 10, at least 15, at least 20, at least 25, at least 30, at least 35, at least 40, at least 45, or at least 50 weight percentage points less than the weight percent of the plurality of solids of the first stream having a particle size less than the cut-off particle size (for example, if 30 wt % of the plurality of solids of the first stream has a particle size less than the cut-off particle size, and this value is reduced by 10, 20, or 30 weight percentage points by disposing the first stream in the solid bowl centrifuge, then 20, 10, or 0 wt %, respectively, of the first portion of the plurality of solids of the first cake has a particle size less than the cut-off particle size); and/or (ii) wherein the weight percent of the second portion of the plurality of solids having a particle size less than the second cut-off particle size is at least 5, at least 10, at least 15, at least 20, at least 25, at least 30, at least 35, at least 40, at least 45, or at least 50 weight percentage points less than the weight percent of the plurality of solids of the first cake having a particle size less than the second cut-off particle size (for example, if 30 wt % of the plurality of solids of the first cake has a particle size less than the second cut-off particle size, and this value is reduced by 10, 20, or 30 weight percentage points by disposing the first cake in the solid bowl centrifuge, then 20, 10, or 0 wt %, respectively, of the second portion of the plurality of solids of the second cake has a particle size less than the second cut-off particle size); and/or (iii) a weight percent of the first portion of the plurality of solids (of the first cake) having a particle size of less than 40 μm is at least 5, at least 10, at least 15, at least 20, at least 25, at least 30, or at least 35 weight percentage points less than a weight percent of the plurality of solids of the first stream having a particle size of less than 40 μm; and/or (iv) a weight percent of the first portion of the plurality of solids (of the first cake) having a particle size of less than 20 μm is at least 5, at least 10, at least 15, at least 20, at least 25, at least 30, or at least 35 weight percentage points less than a weight percent of the plurality of solids of the first stream having a particle size of less than 20 μm; and/or (v) a weight percent of the first portion of the plurality of solids (of the first cake) having a particle size of less than 15 μm is at least 5, at least 10, at least 15, at least 20, at least 25, at least 30, or at least 35 weight percentage points less than a weight percent of the plurality of solids of the first stream having a particle size of less than 15 μm; and/or (vi) a weight percent of the first portion of the plurality of solids (of the first cake) having a particle size of less than 10 μm is at least 5, at least 10, at least 15, at least 20, at least 25, at least 30, or at least 35 weight percentage points less than a weight percent of the plurality of solids of the first stream having a particle size of less than 10 μm; and/or (vii) a weight percent of the first portion of the plurality of solids (of the first cake) having a particle size of less than 5 μm is at least 5, at least 10, at least 15, at least 20, at least 25, at least 30, or at least 35 weight percentage points less than a weight percent of the plurality of solids of the first stream having a particle size of less than 5 μm; and/or (viii) a weight percent of the first portion of the plurality of solids (of the first cake) having a particle size of less than 4 μm is at least 5, at least 10, at least 15, at least 20, at least 25, at least 30, or at least 35 weight percentage points less than a weight percent of the plurality of solids of the first stream having a particle size of less than 4 μm.

Cut-Off Particle Sizes

Embodiment 7. The method of any of the preceding embodiments, wherein the first cut-off particle size is greater than the second cut-off particle size.

Embodiment 8. The method of any of the preceding embodiments, wherein the first cut-off particle size is less than the second cut-off particle size.

Embodiment 9. The method of any of the preceding embodiments, wherein the first cut-off particle size and the second cut-off particle size are independently selected from about 2 μm to about 100 μm, about 2 μm to about 75 μm, about 2 μm to about 50 μm, about 2 μm to about 40 μm, about 2 μm to about 30 μm, about 2 μm to about 20 μm, about 2 μm to about 15 μm, about 2 μm to about 10 μm, about 2 μm to about 5 μm, about 5 μm to about 100 μm, about 10 μm to about 100 μm, about 15 μm to about 100 μm, about 20 μm to about 100 μm, about 30 μm to about 100 μm, about 40 μm to about 100 μm, about 50 μm to about 100 μm, about 60 μm to about 100 μm, about 70 μm to about 100 μm, or about 80 μm to about 100 μm. The cut-off particle sizes may be selected independently from any value within these ranges, and the value may be an integer (e.g., 5 μm, 10 μm, 20 μm, etc.) or a non-integer (e.g., 3.5 μm, 5.2 μm, etc.).

Embodiment 10. The method of any of the preceding embodiments, wherein the first cut-off particle size is size is about 2 μm, about 3 μm, about 4 μm, about 5 μm, about 6 μm, about 7 μm, about 8 μm, about 9 μm, about 10 μm, about 11 μm, about 12 μm, about 13 μm, about 14 μm, about 15 μm, about 16 μm, about 17 μm, about 18 μm, about 19 μm, about 20 μm, about 21 μm, about 22 μm, about 23 μm, about 24 μm, about 25 μm, about 26 μm, about 27 μm, about 28 μm, about 29 μm, about 30 μm, about 31 μm, about 32 μm, about 33 μm, about 34 μm, about 35 μm, about 36 μm, about 37 μm, about 38 μm, about 39 μm, or about 40 μm, or any range between two of these values.

Embodiment 11. The method of any of the preceding embodiments, wherein the second cut-off particle size is about 2 μm, about 3 μm, about 4 μm, about 5 μm, about 6 μm, about 7 μm, about 8 μm, about 9 μm, about 10 μm, about 11 μm, about 12 μm, about 13 μm, about 14 μm, about 15 μm, about 16 μm, about 17 μm, about 18 μm, about 19 μm, about 20 μm, about 21 μm, about 22 μm, about 23 μm, about 24 μm, about 25 μm, about 26 μm, about 27 μm, about 28 μm, about 29 μm, about 30 μm, about 31 μm, about 32 μm, about 33 μm, about 34 μm, about 35 μm, about 36 μm, about 37 μm, about 38 μm, about 39 μm, or about 40 μm, or any range between two of these values.

Embodiment 12. The method of any of the preceding embodiments, wherein the first cut-off particle size is about 15 μm to about 40 μm, about 15 μm to about 30 μm, or about 18 μm to about 22 μm, and the second cut-off particle size is about 2 μm to about 14 μm, about 2 μm to about 12 μm, about 2 μm to about 8 μm, about 2 μm to about 6 μm, or about 2 μm to about 4 μm.

Embodiment 13. The method of any of the preceding embodiments, wherein the first cut-off particle size is about 2 μm to about 12 μm, about 2 μm to about 8 μm, about 2 μm to about 6 μm, of about 2 μm to about 4 μm, and the second cut-off particle size is about 15 μm to about 40 μm, about 15 μm to about 30 μm, about 15 μm to about 25 μm, or about 18 μm to about 22 μm.

Pre-Processing of First Stream

Embodiment 14. The method of any of the preceding embodiments, wherein the first stream comprises a tailings stream or a non-waste stream; or wherein the first stream comprises, consists essentially of, or consists of a cyclone overflow or a flotation feed stream.

Embodiment 15. The method of any of the preceding embodiments, wherein the providing of the first stream comprises disposing a stream in a thickening device; or wherein the providing of the first stream comprises disposing a stream in a thickener to produce a thickener underflow, wherein the first stream comprises, consists essentially of, or consists of the thickener underflow.

Embodiment 16. The method of any of the preceding embodiments, wherein the first stream comprises, consists essentially of, or consists of a high-pressure acid leach (HPAL) residue.

Classification

Embodiment 17. The method of any of the preceding embodiments, wherein the first solid bowl centrifuge and the second solid bowl centrifuge are the same centrifuge, or two different centrifuges.

Embodiment 18. The method of any of the preceding embodiments, further comprising setting and/or adjusting one or more operating parameters of the first solid bowl centrifuge and/or the second solid bowl centrifuge before or during the disposing of the first stream or first cake/first centrate in the first solid bowl centrifuge or second solid bowl centrifuge, respectively.

Embodiment 19. The method of any of the preceding embodiments, wherein the adjusting of the one or more operating parameters of the first solid bowl centrifuge and/or the second solid bowl centrifuge is performed in real time, such as in response to inconsistencies of a stream (e.g., changes in solids concentration, changes in flow rate, etc.) disposed in the first and/or the second solid bowl centrifuge.

Embodiment 20. The method of any of the preceding embodiments, wherein the one or more operating parameters include bowl speed, feed flowrate, differential speed, or a combination thereof.

Additives

Embodiment 21. The method of any of the preceding embodiments, further comprising contacting (i) the first stream and one or more additives before, during, and/or after the disposing of the first stream in the first solid bowl centrifuge, (ii) the first cake and one or more additives before, during, and/or after the disposing of the first cake in the second solid bowl centrifuge, and/or (iii) the first centrate and one or more additives before, during, and/or after the disposing of the first centrate in the second solid bowl centrifuge.

Embodiment 22. The method of any of the preceding embodiments, further comprising contacting the first cake and (i) one or more liquids, (ii) one or more additives, or (iii) a combination thereof to form a stream comprising the first cake, which may be disposed in the second solid bowl centrifuge.

Embodiment 23. The method of any of the preceding embodiments, wherein the one or more additives comprises (consists essentially of, or consists of) a flocculant, a coagulant, a conditioner, a dispersant, a surfactant, or a combination thereof.

Embodiment 24. The method of any of the preceding embodiments, wherein the one or more additives comprises (consists essentially of, or consists of) a dispersant.

Embodiment 25. The method of any of the preceding embodiments, wherein the first stream, the first cake (or a stream comprising the first cake), and/or the first centrate (or a stream comprising the first centrate) is contacted with the additive, such as a dispersant, at an amount of about 1 gram to about 500 grams, about 100 grams to about 500 grams, about 200 grams to about 500 grams, about 250 grams to about 500 grams, about 1 gram to about 400 grams, about 1 gram to about 300 grams, about 1 gram to about 200 grams, about 1 gram to about 150 grams, about 1 gram to about 100 grams, about 1 gram to about 75 grams, about 1 gram to about 50 grams, about 1 gram to about 40 grams, about 1 gram to about 30 grams, about 1 gram to about 20 grams, or about 1 gram to about 10 grams of the dispersant per dry tonne of the solids content of the first stream, first cake, and/or first centrate, wherein the foregoing amounts are amounts of additive only (e.g., dispersant only), and do not include a non-additive liquid (e.g., a non-dispersant liquid), such as water, with which a dispersant may be combined.

Valorization Procedure

Embodiment 26. The method of any of the preceding embodiments, wherein the valorization procedure recovers in the product stream at least 5%, at least 10%, at least 15%, at least 20%, at least 25%, at least 30%, at least 35%, at least 40%, at least 45%, or at least 50%, by weight, more of the material of interest that is present in the first stream than an identical valorization procedure performed directly on the first stream (i.e., without disposing the first stream in a solid bowl centrifuge). For example, if a valorization procedure performed on a first cake, first centrate, second cake, or second centrate recovers 12 units of the material of interest in a product stream, and an identical valorization procedure performed directly on the first stream recovers 10 units of the material of interest, then the valorization procedure performed on the first cake, first centrate, second cake, or second centrate recovers 20% more of the material of interest than the identical valorization procedure.

Embodiment 27. The method of any of the preceding embodiments, wherein the valorization procedure (i) has a throughput capacity (e.g., without a loss of performance, see Examples) that is at least 20%, at least 30%, or at least 40% greater than an identical valorization procedure performed directly on the first stream (i.e., without disposing the first stream in a solid bowl centrifuge), and/or (ii) achieves an uplift in grade of the material of interest of at least 4 percentage points, at least 6 percentage points, or at least 10 percentage points relative to an identical valorization procedure performed directly on the first stream.

Embodiment 28. The method of any of the preceding embodiments, wherein the valorization procedure comprises, consists essentially of, or consists of a physical procedure, a chemical procedure, or a combination thereof.

Embodiment 29. The method of any of the preceding embodiments, wherein the valorization procedure comprises, consists essentially of, or consists of a beneficiation procedure.

Embodiment 30. The method of any of the preceding embodiments, wherein the valorization procedure comprises, consists essentially of, or consists of a flotation procedure, a leaching procedure, a magnetic separation procedure (e.g., a wet, low intensity magnetic separation (WLIMS), a wet, high intensity magnetic separation (WHIMS), or other separation procedure (e.g., filtration, etc.).

Embodiment 31. The method of any of the preceding embodiments, wherein the valorization procedure comprises, consists essentially of, or consists of a refining procedure (e.g., a refining metallurgical procedure) or a smelting procedure.

Embodiment 32. The method of any of the preceding embodiments, further comprising, consisting essentially of, or consisting of reducing an average particle size of—(i) the second plurality of solids of the first cake, and/or (ii) the fourth plurality of solids of the second cake.

Embodiment 33. The method of any of the preceding embodiments, wherein the reducing of the average particle size comprises milling, grinding, etc.

Embodiment 34. The method of any of the preceding embodiments, wherein the reducing of the average particle size is performed before the valorization procedure.

Embodiment 35. The method of any of the preceding embodiments, wherein the flotation procedure comprises, consists essentially of, or consists of (i) reverse flotation, (ii) direct flotation, (iii) reverse flotation and direct flotation (in any order), (iv) a first direct flotation and a second direct flotation, or (v) a first reverse flotation and a second reverse flotation.

Embodiment 36. The method of any of the preceding embodiments, wherein the flotation procedure comprises rougher flotation, scavenger flotation, or a combination thereof.

Embodiment 37. The method of any of the preceding embodiments, wherein the product stream, after the valorization procedure, does not include—or includes a reduced amount of (relative to the first stream, first cake, first centrate, second cake, or second centrate)—gangue minerals, such as mineral carbonates (containing Ca, Mg, Fe, and Mn), mineral silicates that may include Mg, silica, talc, dolomite, or a combination thereof.

Embodiment 38. The method any of the preceding embodiments, wherein the flotation procedure comprises (consists essentially of, or consists of): contacting the first cake or the second cake and a liquid to produce a diluted cake; subjecting the diluted cake to reverse flotation to produce a first froth and a second stream comprising an underflow of the reverse flotation, wherein the second stream comprises a first amount of the material of interest; and subjecting the second stream to direct flotation to produce a second froth and a third stream comprising an underflow of the direct flotation; wherein the second froth is the product stream, which comprises a second amount of the material of interest.

Embodiment 39. The method of any of the preceding embodiments, wherein the first froth comprises at least 50%, at least 60%, at least 70%, or at least 80%, or at least 90%, by weight, of gangue minerals (flow through) present in the first cake or the second cake.

Embodiment 40. The method of any of the preceding embodiments, wherein (A) the first froth comprises at least 50%, at least 60%, at least 70%, or at least 80%, or at least 90%, by weight, of carbonates present in the first cake or the second cake; (B) wherein the second stream comprises at least 50%, at least 60%, at least 70%, or at least 80%, or at least 90%, by weight, of silica present in the first cake, the second cake, or the first froth; or (C) a combination thereof.

Embodiment 41. The method of any of the preceding embodiments, further comprising, prior to and/or during the reverse flotation, contacting the first cake, the second cake, or the diluted cake and (i) an agent effective for maintaining a desired pH, (ii) a collector (which may be an organic collector or an inorganic collector), such as a carbonate collector, or (iii) a combination thereof.

Embodiment 41. The method of any of the preceding embodiments, wherein the agent effective for maintaining the desired pH is an acid.

Embodiment 42. The method of any of the preceding embodiments, wherein the agent effective for maintaining the desired pH is a depressant, such as an apatite depressant, which may include $H_3PO_4$.

Embodiment 43. The method of any of the preceding embodiments, wherein the desired pH is less than 7, such as about 5 to about 6.5, about 5 to about 6, or about 5 to about 5.5.

Embodiment 44. The method of any of the preceding embodiments, wherein the carbonate collector adheres to surfaces of carbonates, such as calcite, dolomite, etc.

Embodiment 45. The method of any of the preceding embodiments, wherein the second stream, prior to the direct flotation, is contacted with a pH modifier, a depressant, a collector, or a combination thereof.

Embodiment 46. The method of any of the preceding embodiments, wherein the second stream, prior to and/or during the direct flotation, is contacted with (i) a depressant (e.g., a gangue mineral depressant), (ii) a pH modifier to maintain a desired pH, (iii) a collector (e.g., a value mineral collector), (iv) a frother, or (v) a combination thereof.

Embodiment 47. The method of any of the preceding embodiments, wherein the depressant comprises $Na_2SiO_3$.

Embodiment 48. The method of any of the preceding embodiments, wherein the pH modifier and/or the depressant is $Na_2CO_3$.

Embodiment 49. The method of any of the preceding embodiments, wherein the pH modifier is NaOH.

Embodiment 50. The method of any of the preceding embodiments, wherein the desired pH is about 9 to about 10, or about 9 to about 9.5.

Treatment of Product Streams, Froths, Underflows, and Centrates

Embodiment 51. The method of any of the preceding embodiments, further comprising disposing the product stream in a thickener.

Embodiment 52. The method of any of the preceding claims, further comprising disposing the first centrate, the second centrate, the first froth, the second stream, or a combination thereof in a thickener.

Embodiment 53. The method of any of the preceding embodiments, further comprising collecting an overflow of the thickener.

Embodiment 54. The method of any of the preceding embodiments, wherein an/the overflow of the thickener comprises clarified water.

Embodiment 55. The method of any of the preceding embodiments, further comprising dewatering an underflow from the thickener with a dewatering apparatus.

Embodiment 56. The method of any of the preceding embodiments, further comprising contacting the underflow from the thickener and one or more additives before, during, and/or after disposing the underflow from the thickener in the dewatering apparatus.

Embodiment 57. The method of any of the preceding embodiments, wherein the one or more additives comprises (consists essentially of, or consists of) a flocculant, a coagulant, a conditioner, a dispersant, a surfactant, or a combination thereof.

Embodiment 58. The method of any of the preceding embodiments, wherein the dewatering apparatus comprises (consists essentially of, or consists of) a centrifuge.

Embodiment 59. The method of any of the preceding embodiments, wherein the dewatering apparatus comprises (consists essentially of, or consists of) a belt press filter, a horizontal belt vacuum filter, a rotary vacuum drum, a rotary vacuum disc filter, a screen bowl centrifuge, a deep cone/paste thickener, a membrane filter press, a solid bowl centrifuge other than the first and second solid bowl centrifuge of any of the preceding embodiments.

Embodiment 60. The method of any of the preceding embodiments, wherein the dewatering apparatus produces a cake and a centrate.

Embodiment 61. The method of embodiment 60, further comprising recovering water from the centrate.

Characteristics of First Stream

Embodiment 62. The method of any of the preceding embodiments, wherein the first plurality of solids is present in the first stream at a concentration of about 10% to about 60%, about 10% to about 50%, about 15% to about 45%, about 20% to about 40%, about 25 to about 35%, or about 30%, by weight, based on the weight of the first stream.

Embodiment 63. The method of any of the preceding embodiments, wherein the plurality of solids that is present in the first stream has a particle size distribution within any one or more of the following weight percentage ranges for any one or more of the particle sizing limits:

| Particle Sizing | Wt % of the plurality of solids |
|---|---|
| Cumulative passing 100 μm % | about 70 to 99, about 75 to about 95, about 80 to about 95, about 85 to about 95, or about 85 to about 90 |
| Cumulative passing 40 μm % | about 45 to about 80, about 50 to about 75, about 55 to about 75, about 60 to about 70, or about 65 |
| Cumulative passing 25 μm % | about 45 to about 75, about 50 to about 70, about 55 to about 65, about 60 to about 65, or about 60 |
| Cumulative passing 20 μm % | about 40 to about 65, about 40 to about 60, about 45 to about 55, about 50 to about 55, or about 52 |
| Cumulative passing 10 μm % | about 30 to about 50, about 35 to about 45, about 38 to about 42, or about 40 |
| Cumulative passing 4 μm % | about 10 to about 30, about 15 to about 25, about 15 to about 20, about 20 to about 25, or about 20 |
| Cumulative passing 2 μm % | about 5 to about 25, about 5 to about 20, about 5 to about 15, about 5 to about 10, about 10 to about 15, or about 10 |

Embodiment 64. The method of any of the preceding embodiments, wherein the material of interest comprises (consists essentially of, or consists of) one or more phosphorus-containing compounds (e.g., phosphates, phosphorus oxides, or a combination thereof), one or more metals (e.g., PGM (platinum group metals), ruthenium, rhodium, palladium, osmium, iridium, platinum, gold, copper, iron, etc.), one or more metal-containing compounds (e.g., a metal oxide, metal carbonate, etc.), one or more minerals (e.g., gypsum), or a combination thereof.

Embodiment 65. The method of any of the preceding embodiments, wherein the material of interest comprises, consists essentially of, or consists of one or more platinum group metals (PGMs), such as 4e PGMs (platinum, palladium, rhodium, and gold), or 6e PGM (platinum, palladium, rhodium, ruthenium, osmium, and iridium).

Embodiment 66. The method of any of the preceding embodiments, wherein the plurality of solids that is present in the first stream comprises bone phosphate of lime.

Embodiment 67. The method of embodiment 66, wherein the bone phosphate of lime is present in the plurality of solids of the first stream at a concentration of about 30% to about 50%, about 35% to about 45%, or about 40% to about 45%, by weight, based on the weight of the first plurality of solids.

Embodiment 68. The method of any of the preceding embodiments, wherein the first plurality of solids of the first stream comprises $P_2O_5$.

Embodiment 69. The method of embodiment 68, wherein the $P_2O_5$ is present in the plurality of solids at a concentration of about 15% to about 25%, or about 15% to about 20%, by weight, based on the weight of the first plurality of solids.

Characteristics and Processing of First Cake

Embodiment 70. The method of any of the preceding embodiments, wherein the first cake and/or the second cake is a coarse particle stream.

Embodiment 71. The method of any of the preceding embodiments, wherein the second plurality of solids is present in the first cake at a concentration of about 60% to about 95%, about 60% to about 90%, about 60% to about 85%, about 60% to about 80%, about 65% to about 75%, or about 70%, by weight, based on the weight of the first cake.

Embodiment 72. The method of any of the preceding embodiments, wherein the second plurality of solids has a particle size distribution within any one or more of the following weight percentage ranges for any one or more of the particle sizing limits:

| Particle Sizing | Wt % of the first portion of the plurality of solids |
|---|---|
| Cumulative passing 100 μm % | about 65 to about 98, about 70 to about 95, about 70 to about 90, about 75 to about 85, or about 80 |
| Cumulative passing 40 μm % | about 3 to about 60, about 10 to about 60, about 20 to about 60, about 30 to about 50, about 35 to about 45, about 40 to about 45, or about 40 |
| Cumulative passing 20 μm % | about 15 to about 40, about 15 to about 35, about 15 to about 30, about 20 to about 30, or about 25 |
| Cumulative passing 10 μm % | about 3 to about 25, about 5 to about 20, about 10 to about 20, or about 15 |

Embodiment 73. The method of any of the preceding embodiments, wherein the second plurality of solids, the third plurality of solids, the fourth plurality of solids, and/or the fifth plurality of solids comprises, consists essentially of, or consists of at least 50%, at least 60%, at least 70%, at least 80%, or at least 90%, by weight, of the material of interest that is present in the first stream (in other words, at least 50%, at least 60%, at least 70%, at least 80%, or at least 90%, by weight, of the material of interest that is present in the first stream is recovered).

Embodiment 74. The method of any of the preceding embodiments, wherein the second plurality of solids, the third plurality of solids, the fourth plurality of solids, and/or the fifth plurality of solids comprises about 50% to about 70%, about 55% to about 65%, or about 60%, by weight, of the bone phosphate of lime present in the first plurality of solids of the first stream.

Embodiment 75. The method of any of the preceding embodiments, wherein the second plurality of solids, the third plurality of solids, the fourth plurality of solids, and/or the fifth plurality of solids comprises bone phosphate of lime, and the bone phosphate of lime is present in the second plurality of solids, the third plurality of solids, the fourth plurality of solids, and/or the fifth plurality of solids, respectively, at a concentration of about 40% to about 50%, about 42% to about 48%, or about 44% to about 46%, by weight, based on the weight of the second, third, fourth, or fifth plurality of solids, respectively.

Embodiment 76. The method of any of the preceding embodiments, wherein the second plurality of solids, the third plurality of solids, the fourth plurality of solids, and/or the fifth plurality of solids comprises $P_2O_5$, and the $P_2O_5$ is present in the second plurality of solids, the third plurality of solids, the fourth plurality of solids, and/or the fifth plurality of solids at a concentration of about 15% to about 25%, or about 15% to about 20%, by weight, based on the weight of the second plurality of solids, the third plurality of solids, the fourth plurality of solids, and/or the fifth plurality of solids, respectively.

Embodiment 77. The method of any of any of the preceding embodiments, wherein the second plurality of solids, the third plurality of solids, the fourth plurality of solids, and/or the fifth plurality of solids comprises $SiO_2$, and the $SiO_2$ is present in the second plurality of solids, the third plurality of solids, the fourth plurality of solids, and/or the fifth plurality of solids, respectively, at a concentration of about 8% to about 15%, about 8% to about 14%, about 8% to about 12%, or about 10%, by weight, based on the weight of the second plurality of solids, the third plurality of solids, the fourth plurality of solids, and/or the fifth plurality of solids, respectively.

Characteristics of Diluted Cake

Embodiment 78. The method of any of the preceding embodiments, wherein (i) the second plurality of solids of the first cake or (ii) the fourth plurality of solids of the second cake is present in the diluted cake at a concentration of about 10% to about 30%, about 15% to about 30%, about 15% to about 25%, or about 15% to about 20%, by weight, based on the weight of the diluted cake.

Characteristics of Third Plurality of Solids

Embodiment 79. The method of any of the preceding embodiments, wherein the third plurality of solids has a particle size distribution within any one or more of the following weight percentage ranges for any one or more of the particle size limits:

| Particle Sizing | Wt % of the second portion of the plurality of solids |
|---|---|
| Cumulative passing 100 μm % | about 85 to about 100, about 90 to about 100, about 95 to about 100, or about 98 to about 100 |
| Cumulative passing 40 μm % | about 80 to about 100, about 85 to about 100, about 90 to about 100, or about 95 to about 100 |
| Cumulative passing 20 μm % | about 75 to about 100, about 80 to about 100, about 85 to about 95, or about 85 to about 90 |
| Cumulative passing 10 μm % | about 65 to about 90, about 65 to about 85, about 70 to about 85, about 70 to about 80, or about 70 to about 75 |

Embodiment 80. The method of any of the preceding embodiments, wherein the third plurality of solids comprises bone phosphate of lime, and the bone phosphate of lime is present in the third plurality of solids at a concentration of about 30% to about 45%, about 35% to about 45%, or about 35% to about 40%, by weight, based on the weight of the third plurality of solids.

Embodiment 81. The method of any of the preceding embodiments, wherein the third plurality of solids comprises $P_2O_5$, and the $P_2O_5$ is present in the third plurality of solids at a concentration of about 15% to about 20%, or about 16% to about 19%, by weight, based on the weight of the third plurality of solids.

Characteristics of the Second Stream

Embodiment 82. The method of any of the preceding embodiments, wherein about 60% to about 80%, about 65% to about 75%, or about 70% to about 75%, by weight, of the second plurality of solids is present in the second stream.

Embodiment 83. The method of any of the preceding embodiments, wherein about 85% to about 99%, about 90% to about 99%, or about 94% to about 96%, by weight, of bone phosphate of lime of the second plurality of solids is present in the second stream.

Embodiment 84. The method of any of the preceding embodiments, wherein about 80% to about 99%, about 85% to about 95%, or about 88% to about 92% of $SiO_2$ present in the second plurality of solid is present in the second stream.

Embodiment 85. The method of any of the preceding embodiments, wherein the second stream has a solids content of about 10% to about 25%, about 10% to about 20%, or about 15% to about 20%, by weight, based on the weight of the second stream.

Embodiment 86. The method of any of the preceding embodiments, further comprising diluting the second stream prior to the direct flotation.

Embodiment 87. The method of embodiment 86, wherein, after the diluting, the second stream has a solids content of about 10% to about 25%, about 10% to about 20%, about 10% to about 15%, or about 15% to about 20%, by weight, based on the weight of the second stream.

Characteristics of the Second Froth

Embodiment 88. The method of any of the preceding embodiments, wherein the second froth has a solids content of about 10% to about 25%, about 10% to about 20%, or about 10% to about 15%, by weight, based on the weight of the second froth.

Embodiment 89. The method of any of the preceding embodiments, wherein about 65% to about 85%, about 65% to about 75%, or about 70% to about 75%, by weight, of solids present in the second stream are present in the second froth.

Embodiment 90. The method of any of the preceding embodiments, wherein about 70% to about 90%, or about 80% to about 85%, by weight, of the material of interest, such as bone phosphate of lime, present in the second stream is present in the second froth.

Embodiment 91. The method of any of the preceding embodiments, wherein about 10% to about 30%, about 15% to about 25%, or about 20% to about 25%, by weight, of $SiO_2$ present in the second stream is present in the second froth.

Embodiment 92. The method of any of the preceding embodiments, wherein bone phosphate of lime is present in the second froth at a concentration of at least 60%, at least 65%, at least 70%, or at least 75%, by weight, based on the weight of the solids content of the second froth.

Embodiment 93. The method of any of the preceding embodiments, wherein $P_2O_5$ is present in the second froth at a concentration of about 20% to about 40%, or about 25% to about 35%, by weight, based on the weight of the solids content of the second froth.

Global Recovery

Embodiment 94. The method of any of the preceding embodiments, wherein at least 20%, at least 30%, at least 40%, at least 50%, at least 60%, at least 70%, at least 80%, or at least 90%, by weight, of the first plurality of solids of the first stream is present in the product stream (e.g., the second froth).

Embodiment 95. The method of any of the preceding embodiments, wherein at least 20%, at least 30%, at least 40%, at least 50%, at least 60%, at least 70%, at least 80%, or at least 90%, by weight, of the material of interest of the first stream is present in the product stream (e.g., the second froth).

Embodiment 96. The method of any of the preceding embodiments, wherein about 20% to about 40% or about 25%, to about 35%, or about 30%, by weight, of the first plurality of solids of the first stream is present in the second froth.

Embodiment 97. The method of any of the preceding embodiments, wherein (A) about 40% to about 60%, or about 45% to about 55%, by weight, of bone phosphate of lime present in the first plurality of solids of the first stream is present in the product stream, such as the second froth; (B) about 40% to about 60%, or about 45% to about 55%, by weight, of $P_2O_5$ present in the first plurality of solids of the first stream is present in the product stream, such as the second froth; or (C) a combination thereof.

Embodiments 98. The method of any of the preceding embodiments, wherein about 5% to about 15%, or about 8% to about 12%, by weight, of $SiO_2$ present in the first plurality of solids of the first stream is present in the product stream, such as the second froth.

Treatment of Streams Between Steps

Embodiment 99. The method of any of the preceding embodiments, further comprising modifying a concentration of solids in any one or more streams of the preceding embodiments (e.g., an underflow, an overflow (e.g., a froth), etc.) between steps (e.g., between disposing a stream in a first and a second solid bowl centrifuge, between classification and valorization, between reverse flotation and direct flotation, etc.), wherein the modifying of the concentration of solids may include thickening the stream.

Systems

Embodiment 100. A system, such as a system, configured to perform a method of any one of the preceding embodiments.

Embodiment 101. A system comprising, consisting essentially of, or consisting of all or a portion of the components depicted at any of FIG. 1A, FIG. 1B, FIG. 1C, FIG. 1D, FIG. 1E, FIG. 2, FIG. 3, and/or FIG. 4.

Embodiment 102. The system of any of the preceding embodiments, wherein the system comprises a first solid bowl centrifuge, optionally a second solid bowl centrifuge, and a valorization (e.g., beneficiation) apparatus, wherein the valorization apparatus is configured to receive a cake (e.g., first cake or second cake) from the first or the second solid bowl centrifuge, a diluted cake (e.g., a stream comprising, consisting essentially of, or consisting of the first cake or the second cake) from the first or the second solid bowl centrifuge, or a first or a second centrate from the first or the second solid bowl centrifuge, respectively.

Embodiment 103. The system of any of the preceding embodiments, further comprising a first thickener, such as a first thickener configured to (i) receive a stream, such as a tailings stream, (ii) provide a first thickener underflow to the first solid bowl centrifuge, or (iii) a combination thereof.

Embodiment 104. The system of any of the preceding embodiments, further comprising a first additive feed, such as a first additive feed configured to contact a stream (such as a stream comprising the first thickener underflow) disposed in the first solid bowl centrifuge and/or the second solid bowl centrifuge with an additive described herein, such as a dispersant.

Embodiment 105. The system of any of the preceding embodiments, further comprising a liquid feed, such as a liquid feed configured to contact a liquid and a cake produced by the first and/or second solid bowl centrifuge to produce a diluted cake, such as a diluted first cake or a diluted second cake.

Embodiment 106. The system of any of the preceding embodiments, wherein the valorization apparatus is a flotation apparatus, which comprises a reverse flotation apparatus (e.g., one or more reverse flotation apparatuses), a direct flotation apparatus (e.g., one or more direct flotation apparatuses), or a combination thereof.

Embodiment 107. The system of any of the preceding embodiments, wherein the valorization apparatus is a flotation apparatus, which may be selected from a rougher flotation apparatus, a scavenger flotation apparatus, or a combination thereof.

Embodiment 108. The system of any of the preceding embodiments, wherein the reverse flotation apparatus is configured to receive a first cake, a second cake, a diluted first cake, or a diluted second cake from the first or the second solid bowl centrifuge, and the direct flotation apparatus is configured to receive a stream comprising an underflow from the reverse flotation apparatus.

Embodiment 109. The system of any of the preceding embodiments, further comprising a second thickener, wherein the second thickener may be configured to receive one or more streams from (i) the valorization apparatus (such as a froth from the reverse flotation apparatus and/or an underflow from the direct flotation apparatus), (ii) the first and/or the second solid bowl centrifuge (such as a stream comprising a first or a second centrate of the first or the second solid bowl centrifuge, respectively), or (iii) a combination thereof.

Embodiment 110. The system of any of the preceding embodiments, further comprising a dewatering apparatus, wherein the dewatering apparatus may be configured to receive an underflow from the second thickener.

Embodiment 111. The system of any of the preceding embodiments, wherein the dewatering apparatus comprises (consists essentially of, or consists of) a belt press filter, a horizontal belt vacuum filter, a rotary vacuum drum, a rotary vacuum disc filter, a screen bowl centrifuge, a deep cone/paste thickener, a membrane filter press, a solid bowl centrifuge other than the first and/or the second solid bowl centrifuge of any of the preceding embodiments.

Embodiment 112. The system of any of the preceding embodiments, further comprising a second additive feed, such as a second additive feed configured to contact a stream (such as a stream comprising the second thickener underflow) disposed in the dewatering apparatus with an additive described herein, such as a flocculant.

EXAMPLES

The present disclosure is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description, may suggest themselves to one of ordinary skill in the art without departing from the spirit of the present disclosure or the scope of the appended claims. Therefore, other aspects of this disclosure will be apparent to those skilled in the art from consideration of the specification and practice of the embodiments disclosed herein.

Example 1—Classification of Stream

In this example, a stream that included a plurality of solids was processed with a solid bowl centrifuge to produce a classified product. The stream of this example was disposed in a solid bowl centrifuge, which bifurcated the first stream into a cake and a centrate, as depicted, for example, at FIG. 1A. The cake of this example was referred to as a coarse particle stream, and the centrate of this example was referred to as an ultrafine particle stream.

The tested streams were characterized as depicted at the following table, and, after multiple classification runs, the cakes and centrates were characterized in the same manner.

| | First Stream Prior to Classification | | | Cake (i.e., coarse particle stream) | | | Centrate (i.e., ultrafine particle stream) | | |
|---|---|---|---|---|---|---|---|---|---|
| | Average | Min. | Max. | Average | Min. | Max. | Average | Min. | Max. |
| Solids % wt | 30.1 | 22.9 | 35.9 | 73.3 | 70.0 | 75.4 | 17.0 | 9.8 | 27.4 |
| Solids particle specific gravity (SG) | 2.9 | 2.7 | 2.9 | 2.9 | 2.6 | 3.0 | 2.8 | 2.4 | 2.8 |
| Slurry SG | 1.244 | 1.175 | 1.305 | 1.928 | 1.812 | 1.984 | 1.122 | 1.067 | 1.169 |
| Particle sizing | | | | | | | | | |
| Cumulative passing 100 μm % | 88.2 | 75.5 | 95.2 | 79.7 | 69.8 | 97.0 | 99.5 | 85.6 | 100.0 |
| Cumulative passing 40 μm % | 65.5 | 51.3 | 75.3 | 42.9 | 4.4 | 59.8 | 97.3 | 45.3 | 100.0 |
| Cumulative passing 20 μm % | 51.9 | 40.1 | 61.8 | 25.8 | 18.7 | 37.0 | 88.7 | 24.5 | 97.3 |
| Cumulative passing 10 μm % | 40.3 | 31.5 | 48.1 | 15.6 | 4.5 | 23.5 | 73.8 | 14.3 | 88.9 |
| Phosphate product analysis | | | | | | | | | |
| Bone Phosphate of Lime (BPL) content % | 41.8 | 38.3 | 44.6 | 45.1 | 39.9 | 49.0 | 38.7 | 36.4 | 44.0 |
| $P_2O_5$ % | 18.9 | 15.3 | 20.4 | 20.6 | 18.3 | 22.4 | 17.7 | 16.7 | 20.1 |
| Contaminant analysis | | | | | | | | | |
| MgO % | 3.9 | 2.0 | 27.8 | 2.8 | 2.0 | 3.3 | 2.3 | 1.7 | 2.6 |
| Cadmium (ppm) | 20.3 | 11.0 | 30.0 | 27.8 | 23.0 | 41.0 | 12.3 | 9.0 | 19.0 |

-continued

| | First Stream Prior to Classification | | | Cake (i.e., coarse particle stream) | | | Centrate (i.e., ultrafine particle stream) | | |
|---|---|---|---|---|---|---|---|---|---|
| | Average | Min. | Max. | Average | Min. | Max. | Average | Min. | Max. |
| $Al_2O_3$ % | 3.3 | 2.9 | 5.5 | 1.3 | 1.1 | 1.4 | 5.1 | 2.3 | 5.9 |
| $Fe_2O_3$ % | 1.2 | 1.0 | 2.0 | 0.5 | 0.4 | 0.6 | 1.9 | 1.1 | 2.3 |
| $SiO_2$ | 13.2 | 12.2 | 17.9 | 10.3 | 9.1 | 13.0 | 17.2 | 15.9 | 18.1 |
| Reactive $SiO_2$ | 8.4 | 7.3 | 9.3 | 4.8 | 4.1 | 5.2 | 11.4 | 9.4 | 13.6 |
| Minor Element ratio MER - calculated as $(Al_2O_3 + Fe_2O_3 + MgO)/P_2O_5$ | 0.44 | 0.38 | 1.73 | 0.22 | 0.19 | 0.23 | 0.52 | 0.31 | 0.53 |

As depicted in the foregoing table, the stream, the centrate, and the cake included solids of various sizes, such as less than 40 μm. However, solids having particle sizes less than 40 μm constituted, on average, about 65%, by weight, of the solids in the stream prior to classification, about 97%, by weight, of the solids in the centrate, and about 43%, by weight, of the solids in the cake. As a result, the classification process of this example produced a cake having a reduced weight percentage of ultrafine particles (e.g., those having a particle size less than 40 μm).

The efficiency of the classification process of this example also was measured by determining various recovery percentages, as depicted at the following table.

| | Recovery to Cake (Wt %) Average | Recovery to Centrate (%) Average |
|---|---|---|
| Solids % wt | 57.8 | 42.2 |
| Solids particle specific gravity (SG) | | |
| Slurry SG | | |
| Particle sizing | | |
| Cumulative passing 100 μm % | | |
| Cumulative passing 40 μm % | | |
| Cumulative passing 20 μm % | 28.9 | 71.1 |
| Cumulative passing 10 μm % | 22.4 | 77.6 |
| Phosphate product analysis | | |
| Bone Phosphate of Lime (BPL) content % | 61.9 | 38.1 |
| $P_2O_5$ % | 62.3 | 37.7 |
| Contaminant analysis | | |
| MgO % | 60.4 | 39.6 |
| Cadmium (ppm) | 79.3 | 20.7 |
| $Al_2O_3$ % | 22.3 | 77.7 |
| $Fe_2O_3$ % | 24.7 | 75.3 |
| $SiO_2$ | 45.9 | 54.1 |
| Reactive $SiO_2$ | 33.1 | 66.9 |
| Minor Element ratio MER - calculated as $(Al_2O_3 + Fe_2O_3 + MgO)/P_2O_5$ | | |

The data of this table indicates, for example, that the cakes, on average, included (i) about 58%, by weight, of the solids present in the stream prior to classification, but (ii) only about 29%, by weight, of the solids having particle sizes less than 20 μm that were present in the stream prior to classification.

The centrates of this example were then disposed in a thickener, as described herein.

Example 2—Reverse Flotation

In this example, the cakes of Example 1 were subjected to a reverse flotation procedure, which may be referred to as a reverse carbonate flotation.

A cake of Example 1 was first diluted with a liquid to form a diluted cake having an average solids content of about 18%, by weight, based on the weight of the diluted cake.

A portion of the streams tested in this example were agitated for about one minute, contacted with an agent to maintain a pH of about 5 to about 5.5, and contacted with a carbonate collector.

In this example, the agent to maintain the pH of about 5 to about 5.5 was an apatite depressant, such as $H_3PO_4$.

The carbonate collector used in some tests was an agent that adhered to surfaces of carbonates, such as dolomite and calcite. The carbonate collector facilitated or assisted the removal of carbonates during the reverse flotation procedure of this example.

The reverse carbonate flotation procedure of this example produced a froth overflow, and a product underflow. Both of these streams were characterized as depicted at the following table.

Characterization of Reverse Flotation Streams

| | Feed | Reject (Overflow) | Product (Underflow) | Recovery to Underflow Wt % |
|---|---|---|---|---|
| Solids % wt | 18.0 | 16.6 | 12.4 | 71.1 |
| Solids particle specific gravity (SG) | | | | |
| Slurry SG | | | | |
| Particle sizing | | | | |
| Cumulative passing 100 μm % | | | | |
| Cumulative passing 40 μm % | | | | |
| Cumulative passing 20 μm % | | | | |
| Cumulative passing 10 μm % | | | | |
| Phosphate product analysis | | | | |
| Bone Phosphate of Lime (BPL) content % | 45.5 | 8.0 | 60.7 | 94.9 |
| $P_2O_5$ % | 20.8 | 3.7 | 27.8 | 94.9 |
| Contaminant analysis | | | | |
| MgO % | 3.9 | 12.6 | 0.4 | 7.6 |
| Cadmium (ppm) | | | | |
| $Al_2O_3$ % | 1.8 | 1.1 | 2.1 | 82.2 |
| $Fe_2O_3$ % | 0.7 | 0.4 | 0.8 | 82.1 |
| $SiO_2$ | 12.8 | 4.1 | 16.4 | 90.9 |
| Reactive $SiO_2$ | | | | |
| Minor Element ratio MER - calculated as $(Al_2O_3 + Fe_2O_3 + MgO)/P_2O_5$ | 0.31 | 3.86 | 0.12 | |

In this example, a material of interest was bone phosphate of lime, and about 95%, by weight, of the bone phosphate of lime that was present in the feed was recovered in the underflow of the reverse flotation procedure of this example.

Example 3—Direct Flotation

In this example, the underflow collected from the reverse flotation of Example 2 was subjected to a direct flotation process, which may be referred to as direct apatite flotation.

The underflow of the reverse flotation of Example 2 may be diluted or concentrated prior to the direct flotation process of this example.

Prior to direct flotation, the underflow of the reverse flotation of Example 2 was contacted with (i) a pH modifier and silica depressant, such as $Na_2SiO_3$, (ii) a pH modifier and calcium-bearing minerals depressant, such as $Na_2CO_3$, (iii) a pH modifier, such as NaOH, to maintain a pH of about 9 to about 9.5, and (iv) an apatite collector.

The direct flotation process of this example produced an underflow and a product overflow. Each of these streams was characterized, as depicted at the following table.

Characterization of Direct Flotation Streams

| | Feed | Reject (Overflow) | Product (Underflow) | Recovery to Overflow Wt % |
|---|---|---|---|---|
| Solids % wt | 16.2 | 3.3 | 14.5 | 72.2 |
| Solids particle specific gravity (SG) | | | | |
| Slurry SG | | | | |
| Particle sizing | | | | |
| Cumulative passing 100 μm % | | | | |
| Cumulative passing 40 μm % | | | | |
| Cumulative passing 20 μm % | | | | |
| Cumulative passing 10 μm % | | | | |
| Phosphate product analysis | | | | |
| Bone Phosphate of Lime (BPL) content % | 60.7 | 36.0 | 70.2 | 83.5 |
| $P_2O_5$ % | 27.8 | 16.5 | 32.1 | 83.5 |
| Contaminant analysis | | | | |
| MgO % | 0.4 | 0.3 | 0.5 | 83.1 |
| Cadmium (ppm) | | | | |
| $Al_2O_3$ % | 2.1 | 4.0 | 1.3 | 46.6 |
| $Fe_2O_3$ % | 0.8 | 1.3 | 0.6 | 53.1 |
| $SiO_2$ | 16.4 | 45.0 | 5.4 | 23.5 |
| Reactive $SiO_2$ | | | | |
| Minor Element ratio MER - calculated as $(Al_2O_3 + Fe_2O_3 + MgO)/P_2O_5$ | 0.12 | 0.33 | 0.07 | |

As described herein, the product overflow may be disposed in a thickener.

Example 4—Determination of Overall Efficiency

The characterization of the product overflow, i.e., froth, of Example 3 was determined and compared to the characterization of the initial input stream of Example 1 in order to determine the overall recovery percentages of the processes. The results of this analysis are depicted at the following table:

Global Recoveries

| | Recovery to Final Product (Wt %) | Rejected (Wt %) |
|---|---|---|
| Solids % wt | 29.7 | 70.3 |
| Solids particle specific gravity (SG) | | |
| Slurry SG | | |
| Particle sizing | | |
| Cumulative passing 100 μm % | | |
| Cumulative passing 40 μm % | | |
| Cumulative passing 20 μm % | | |
| Cumulative passing 10 μm % | | |
| Phosphate product analysis | | |
| Bone Phosphate of Lime (BPL) content % | 49.1 | 50.9 |
| $P_2O_5$ % | 49.4 | 50.6 |
| Contaminant analysis | | |
| MgO % | 3.8 | 96.2 |
| Cadmium (ppm) | | |
| $Al_2O_3$ % | 8.6 | 91.4 |
| $Fe_2O_3$ % | 10.8 | 89.2 |
| $SiO_2$ | 9.8 | 90.2 |
| Reactive $SiO_2$ | | |
| Minor Element ratio MER - calculated as $(Al_2O_3 + Fe_2O_3 + MgO)/P_2O_5$ | | |

As depicted at the foregoing table, the processes of Examples 1-3 recovered about 30%, by weight, of the solids present in the initial feed of Example 1, nearly 50%, by weight, of the bone phosphate of lime that was present in the initial feed, and only about 10%, by weight, of $SiO_2$ that was present in the initial feed.

Example 5—Removal of Ultra-Fines, Including Ultra-Fine Talc

In this example, the benefits, particularly the metallurgical benefits, of removing or reducing ultra-fines, such as ultra-fine talc (e.g., <4 μm), from a feed stream were evaluated.

Platinum group metal (PGM) flotation plants typically recover PGMs to a concentrate by using several stages of flotation. The flotation procedures are configured to recover and concentrate PGMs from waste materials, which can include chromite and talc. The presence of ultra-fine particles (e.g., <3 or 4 μm), such as ultra-fine talc particles, in a flotation feed, however, can undesirably impact flotation performance, such as by increasing flotation feed slurry viscosity, reducing flotation kinetics, reducing PGM recovery, reducing final concentrate grade, or a combination thereof.

As explained in this example, however, embodiments of the methods described herein improved flotation performance. For example, by removing solids having sizes less than or equal to about 3 μm prior to flotation, the following improvements were observed for embodiments of the following flotation processes (compared to flotation processes applied to the raw starting materials that were not subjected to classification via one or more solid bowl centrifuges): (i) a 34% increase in flotation throughput capacity, which likely due, at least in part, to the observed 24 wt % increase in the solids content of the flotation feed slurry, (ii) an 18% increase in PGM recovery, and (iii) an 82% increase in cleaner product grade.

The feed stream of this example was subjected to comprehensive laboratory scale testing, which included centrifuge classification, and the flotation of the raw feed (for comparison) and a deslimed cake. The results of the tests were evaluated to assess the impact on PGM recovery, grade, and flotation kinetics.

In this example, centrifuge classification was undertaken on a feed stream that included PGMs and ultra-fine particles, including ultra-fine talc. As explained below, the centrifuge, in certain tests, achieved an efficient low cut point (e.g., 3 μm to 4 μm), while recovering at least 90%, by weight (e.g., about 92 wt %), of PGMs to the cake. These results were achieved by adjusting the centrifuge settings, as described herein, particularly the speed and flow rate. Although the centrifuge classification, in most instances, did not recover ultra-fine PGMs (i.e., <3 μm), this feature was likely advantageous, because ultra-fine PGMs can be difficult to recover through certain flotation processes.

In this example, rougher-scavenger flotation was performed. Samples of raw feed and deslimed cake were floated at a bench scale to assess the impact on flotation recovery and flotation kinetics across the rougher-scavenger. An analysis of the classified cakes indicated the following results.

PGM Recovery—About a 10% increase in global PGM recovery was achieved compared to bulk flotation tests, at a higher concentrate grade and concentration ratio.

Flotation Kinetics—A significant increase in flotation kinetics was achieved with a PGM recovery of about 30%, by weight, in about 10 minutes for deslimed cakes compared to about 30 minutes for the raw feed. This result translated to about a 70% increase in fast floating PGMs.

Throughput—The classification of ultra-fine talc in this example permitted the deslimed cakes to be floated at about 26%, by weight, of feed solids, without a loss of flotation performance. This result indicated the potential to increase plant throughput capacity due to the classification.

In this example, samples of raw feed and deslimed cake were bench floated in batches to collect rougher and scavenger concentrates, and then refloated to assess the impact on flotation recovery, grade, and flotation kinetics across the cleaner circuit. An analysis of the classified cake indicated the following results.

PGM Grade—An increase of cleaner PGM grade of about 82%, by weight, was achieved, which likely resulted from a doubling of the "fast cleaner" concentration ratio. This most likely permitted increased PGM recovery by creating significant improvements across the plant. A final chromite grade was also reduced from about 5.8% to about 5.2%.

Flotation Kinetics—A significant increase in cleaner flotation kinetics was observed, with about a 100% increase in PGMs recovered to the final concentration from the fast cleaner flotation at high grade. This indicated a potential to decrease load on columns, reconfigure cleaner circuits, and/or reduce recirculating loads from the cleaner circuit.

It should be noted that the results of this example were laboratory scale from a single fresh feed sample. A person of ordinary skill in the art would be aware that actual plant results may be impacted by a number of factors, such as plant modifications made since the sample was taken (e.g., recirculation of slow cleaner tails), differences in plant conditions relative to laboratory conditions (e.g., flotation energy and mass pull), feed type and variability over time, the impact of re-grinding on cleaner feed, etc.

The laboratory scale results of this example indicated a material benefit can be achieved through embodiments of the classification methods described herein. For example, the results show potential for an uplift in throughput capacity of up to about 35%, and a flotation recovery benefit of up to about 40%. The whole of plant mass balance with and without classification, based on the laboratory results of this example, is provided in the following table:

Analysis of Flotation With and Without Classification

| | Feed | Concentrate | Tailings |
|---|---|---|---|
| Flotation of Raw Feed without Classification | 95 tph<br>3.81 grade gpt<br>7,565 PGM oz/mth<br>100% PGM dist | 1.1 tph<br>132.85 grade gpt<br>3,082 PGM oz/mth<br>41% PGM dist | 93.9 tph<br>2.28 grade gpt<br>4,483 PGM oz/mth<br>59% PGM dist |
| Flotation after Classification (Total Uplift Potential) | 128.25 tph<br>3.93 grade gpt<br>10,528 PGM oz/mth<br>100% PGM dist | 2.1 tph<br>132.85 grade gpt<br>5,789 PGM oz/mth<br>55% PGM dist | 126.2 tph<br>1.80 grade gpt<br>4,739 PGM oz/mth<br>45% PGM dist |
| Flotation after Classification (Recover and Grade Uplift Only) | 95 tph<br>3.93 grade gpt<br>7,799 PGM oz/mth<br>100% PGM dist | 1.5 tph<br>132.85 grade gpt<br>4,100 PGM oz/mth<br>53% PGM dist | 93.5 tph<br>1.89 grade gpt<br>3,699 PGM oz/mth<br>47% PGM dist |

Feed Material—A bulk sample of the feed material tested in this example was homogenized, and sub-sampled for a detailed characterization of the particle size distribution, mineral composition, talc content, and PGM content. The characterization results are provided at the following table:

Characterization of Feed Material

| Properties | | Results |
|---|---|---|
| Physical Properties | Solids specific gravity | 3.19 |
| | wt % passing 25 μm | 60.7 |
| | wt % passing 4 μm | 20.1 |
| | wt % passing 2 μm | 10.0 |
| Chemical Properties | 4e PGM (g/t) | 4.28 |
| Mineralogy | Smectite | 15 |
| | Talc | 7 |
| | Pyroxenes | 15 |
| | Spinels | 27 |
| | Plagioclase | 34 |

Classification Testing—A series of initial classification tests was performed to assess classification efficiency and an influence of the centrifuge parameters on classification outcomes. This phase of the testing focused on varying the flowrate and bowl speeds at 33 wt % and 25 wt % feed solids. A clear visually observable color difference between the feed stream and the centrate indicated an effective chromite and talc separation.

The results from this phase of the classification testing are given in the following table.

Phase 1 Centrifuge Classification Results

| Feature | Test No. 1 | 2 | 3 | 4 | 5 | 6 | 7 |
|---|---|---|---|---|---|---|---|
| Feed solids (wt %) | 33.7 | 33.2 | 34.1 | 34.1 | 25.8 | 25.6 | 25.6 |
| Bowl speed (%) | 65 | 55 | 65 | 75 | 65 | 65 | 75 |
| Feed flowrate ($m^3$/h) | 1.15 | 1.14 | 1.84 | 1.82 | 1.15 | 2.13 | 1.83 |
| 4e PGM grade (gpt) (platinum, palladium, rhodium, gold) | 4.8 | 4.6 | 4.5 | 4.4 | 4.4 | 4.4 | 3.9 |
| Cake moisture (wt %) | 18.7 | 19.5 | 18.9 | 18.6 | 18.4 | 18.6 | 18.6 |
| $S_{50}$ (μm) | 4.1 | 5.0 | 6.8 | 5.0 | 3.9 | 5.1 | 4.5 |
| Solids recovery (wt %) | 92.9 | 91.9 | 90.7 | 91.9 | 92.3 | 90.5 | 91.4 |
| Liquid recovery (wt %) | 10.8 | 11.1 | 11.2 | 10.9 | 7.1 | 7.1 | 7.0 |
| 4e PGM recovery (wt %) | 92.1 | 90.5 | 89.3 | 90.8 | 90.8 | 89.8 | 90.4 |
| $Cr_2O_3$ recovery (wt %) | 98.7 | 98.4 | 97.9 | 98.5 | 98.8 | 98.2 | 98.5 |

The results of this table demonstrated that the feeds solid wt % minimally impacted PGM recovery, but, generally, higher feed solids concentration (wt %) resulted in greater liquid recoveries to the cake. Also, an increased flow rate for a given bowl speed generally increased $S_{50}$ (the classification cut-off particle size), and generally reduced PGM recovery (e.g., Test No. 1 v. Test No. 3; or Test No. 5 v. Test No. 6). Generally, a greater bowl speed for a similar feed flowrate was observed, in these tests, to increase PGM recovery (e.g., Test No. 1 v. Test No. 2; Test No. 3 v. Test No. 4; and Test No. 6 v. Test No. 7). In all of the performed tests, chromite recovery to the cake was relatively high (i.e., >97 wt %). Also, in all of the performed tests, the deslimed cakes had relatively low cake moistures.

Test No. 1 of the foregoing table was also analysed to determine the 6e PGM content, which showed a greater relative rhodium recovery to the centrifuge cake, as shown in the following table:

Test No. 1 6e PGM Recovery to Centrifuge Cake

| Test No. | 6e PGM (wt %) | Pt (wt %) | Pd (wt %) | Rh (wt %) | Au (wt %) | Ru (wt %) | Ir (wt %) |
|---|---|---|---|---|---|---|---|
| 1 | 93.5 | 92.5 | 93.7 | 95.9 | 94.8 | 93.3 | 94.7 |

Classified and Unclassified Flotation Testing—In this phase of the example, six centrifuge tests were conducted at bowl speeds of 70% and 80%, and at 1.0, 1.5, and 2.0 $m^3$/h feed flowrates. During each test, a sufficient sample was collected for a raw feed flotation and a deslimed cake flotation to be performed.

From the initial solids recovery results, three test runs were selected to continue to flotation testing. The classification results for these three tests are provided at the following table:

Centrifuge Classification Results

| Feature | Test No. 1 | 2 | 6 |
|---|---|---|---|
| Feed solids (wt %) | 25.4 | 25.7 | 24.9 |
| Bowl speed (%) | 70 | 70 | 80 |
| Feed flowrate ($m^3$/h) | 1.0 | 1.5 | 1.0 |
| 4e PGM grade (gpt) (platinum, palladium, rhodium, gold) | 3.6 | 3.2 | 3.2 |
| Cake moisture (wt %) | 18.3 | 18.6 | 18.7 |
| Solids recovery (wt %) | 91.8 | 90.8 | 91.3 |
| Liquid recovery (wt %) | 7.0 | 7.2 | 7.0 |
| 4e PGM recovery (wt %) | 87.8 | 83.2 | 86.6 |
| $Cr_2O_3$ recovery (wt %) | 98.8 | 98.3 | 98.7 |

The 4e PGM feed grade and recovery was lower than in the foregoing testing, likely due to the recycling of cake and centrate. Test 2 also was conducted at a greater flowrate, which resulted, in this instance, in a lower PGM recovery.

The flotation testing of this example was completed using a 10 L Denver cell. An overview of the 14 flotation tests conducted in this phase of the example is provided at the following table:

Overview of Flotation Tests

| Classification Test No. | Sample | Feed Solids (wt %) | Bead Mill Polish |
|---|---|---|---|
| Reserve feed | Raw feed | ~25 | No |
| Reserve feed | Raw feed | ~25 | Yes, target 30 μm P80. |
| 1 | Deslimed cake | ~25 | No |
| 1 | Deslimed cake | ~25 | Yes, target 30 μm P80. |
| 2 | Deslimed cake | ~25 | No |
| 2 | Deslimed cake | ~25 | Yes, target 30 μm P80. |
| 1 | Raw feed | ~25 | No |
| 1 | Raw feed | ~25 | Yes, target 30 μm P80. |
| 2 | Raw feed | ~25 | No |
| 2 | Raw feed | ~25 | Yes, target 30 μm P80. |
| 6 | Raw feed | ~25 | No |
| 6 | Raw feed | ~25 | Yes, target 30 μm P80. |
| 6 | Deslimed cake | ~25 | No |
| 6 | Deslimed cake | ~25 | Yes, target 30 μm P80. |

Figure 5:
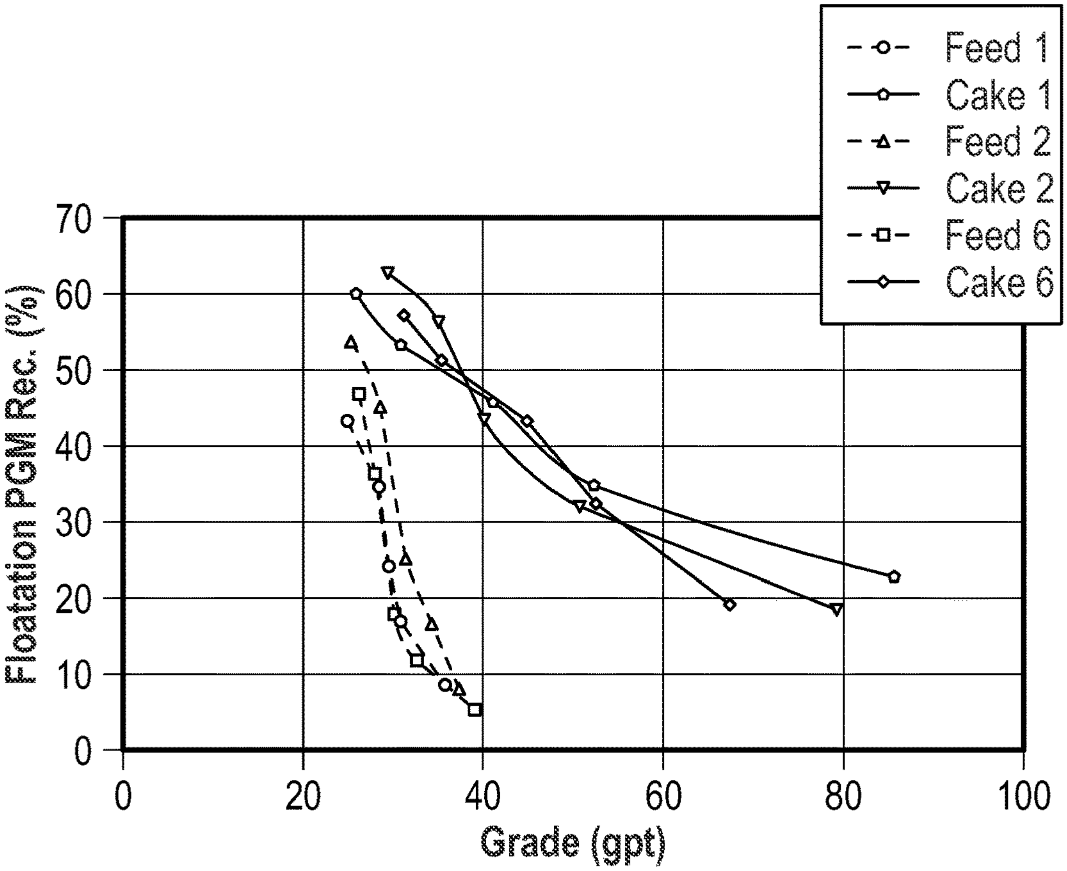
FIG. 5 depicts a plot of flotation grade recovery curves observed for various embodiments of the methods described herein.

For the raw feed and deslimed cake, rougher scavenger flotation grade and PGM recovery results were compared, as depicted at FIG. 5. The removal of ultra-fine talc resulted in a clear recovery and grade uplift in the rougher scavenger flotation tests performed in this example, with the deslimed cake achieving, on average, an upgrade ratio of 7.5 v. 6.0 for the raw feed.

Global PGM recovery uplift across final concentrates from rougher scavenger flotation increased to about 6.6 percentage points greater, and at a higher grade for deslimed cake versus raw feed. The recovery uplift would probably be even greater for an equivalent grade target.

Figure 6:
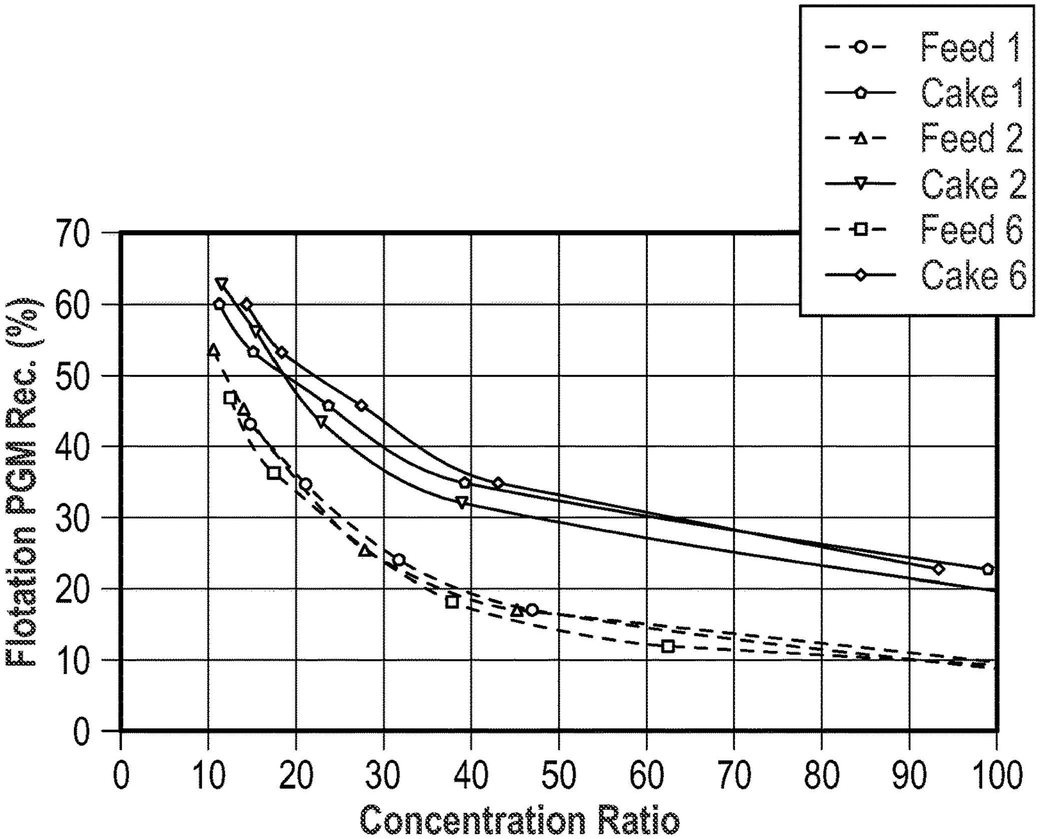
FIG. 6 depicts a plot of flotation platinum group metals (PGM) recovery percentage versus concentration ratio for embodiments of the methods described herein.

As well as achieving a greater recovery and grade, the deslimed cake flotation also was more selective in its mass pull. This result was indicated by the fact that the deslimed cake flotation had a greater concentration ratio for a given PGM recovery for all flotation fractions (see FIG. 6). The raw feed curve also steepened more quickly as the recovery increased, which pointed to a less selective scavenger flotation when compared to the deslimed cake curve.

Figure 7:
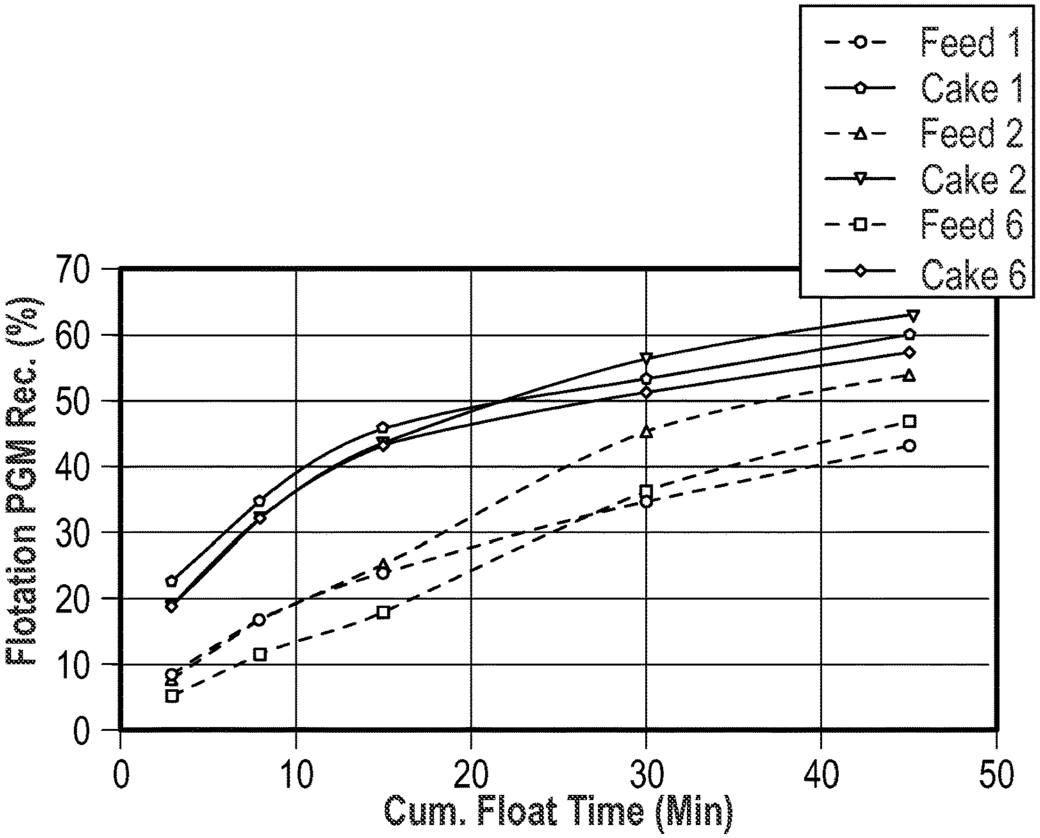
FIG. 7 depicts a plot of flotation kinetics curves corresponding to embodiments of the methods described herein.

Desliming the feed prior to flotation also resulted in a significant increase in the flotation kinetics compared to the raw feed (see FIG. 7). The raw feed flotation recovery over time was almost linear, whereas the deslimed cake showed a much faster recovery of a majority of the PGMs in a relatively shorter time. Deslimed cake, in some instances, achieved a 3× upgrade in kinetics (e.g., 30 wt % PGM recovery in about 10 minutes compared to about 30 minutes for raw feed), which translated to about a 70% increase in fast floating PGMs.

Samples that were polished prior to flotation, in each instance, exhibited a lower recover and grade at final concentrate. This was probably due to the liberation of ultra-fine talc, which likely suppressed PGM grade and recovery. The flotation process of this example included three stages: roughing, cleaning, and scavenging. In some instances, the cleaner concentrate was floated in a further step that is often referred to as "polishing", which resulted in further removal of ultrafine gangue minerals, such as talc and clays.

Classification of ultra-fine talc permitted deslimed cake to be floated at 26 wt % feed solids without any loss (or an undesirable loss) of flotation performance.

A significant increase in the maximum feed solids concentration to flotation may result in increased throughput capacity. For example, if a known process has a flotation feed solids limit of about 21 wt %, then the ability to feed a flotation process at 26 wt % would result in about a 35% increase in throughput capacity.

Classified and Unclassified Cleaner Flotation Testing—In the next phase of this example, testing was performed to assess the impact of desliming rougher scavenger flotation feed on the performance of the subsequent fast and slow cleaner flotation. The impact on the cleaner kinetics, global recovery, and grade of PGMs and chromite were determined.

To generate a deslimed sample for this test, the centrifuge classification explained at the following table was run, and sufficient raw feed and deslimed cake was collected for the cleaner flotation testing. The original bulk sample was used in this test, and a higher PGM recovery was obtained, which was consistent with the first phase testing of this example.

Centrifuge Classification Results

| Feature | Test No. 1 |
|---|---|
| Feed solids (wt %) | 20.1 |
| Bowl speed (%) | 70 |
| Feed flowrate ($m^3$/h) | 2.0 |
| 4e PGM grade (gpt) (platinum, palladium, rhodium, gold) | 4.3 |
| Cake moisture (wt %) | 17.5 |
| $S_{50}$ (μm) (Cut-off Particle Size) | 4.1 |
| Solids recovery (wt %) | 90.3 |
| Liquid recovery wt %) | 8.7 |
| 4e PGM recovery (wt %) | 90.1 |
| $Cr_2O_3$ recovery (wt %) | 98.5 |

To simulate a fast cleaner flotation feed, the first two concentrates from the rougher scavenger flotation test were combined and refloated as a fast cleaner. Remaining concentrates were combined and refloated as a slow cleaner. To generate enough mass for 4e PGM analysis on the cleaner fractions, 4 deslimed cakes and 3 raw feed rougher scavenger flotations were completed.

Figure 8:
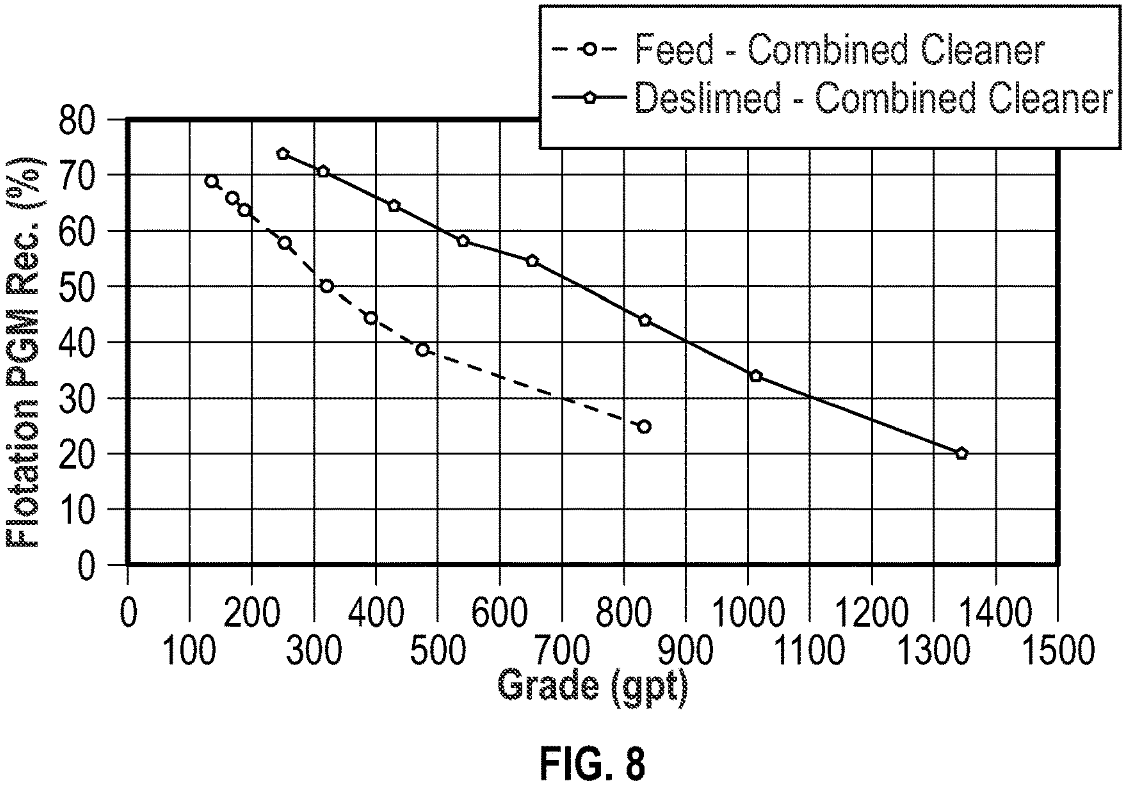
FIG. 8 depicts a plot of cleaner flotation grade recovery curves for embodiments of the methods described herein.

The results shows a clear PGM recovery and grade uplift for deslimed cake v. raw feed across cleaner flotation, as seen at FIG. 8. The raw feed PGM cleaner recovery was 69% at a grade of 137 gtp, while the deslimed cake PGM cleaner recovery was 74% at a grade of 250 gpt. The higher grade from deslimed cake likely reflected an upgraded ratio on the fast cleaners of 6 compared to 3 achieved on the raw feed.

The deslimed cake resulted in a slightly lower chromite recovery at 0.2 wt % and grade of 5.2% compared to a recovery of 0.3 wt % and grade of 5.8% for the raw feed. The reduction in final chromite grade from the deslimed sample can be attributed to better rejection in the slow cleaner, with a recovery of 8.7 wt % v. 12.4 wt % in the raw feed test.

Figure 9:
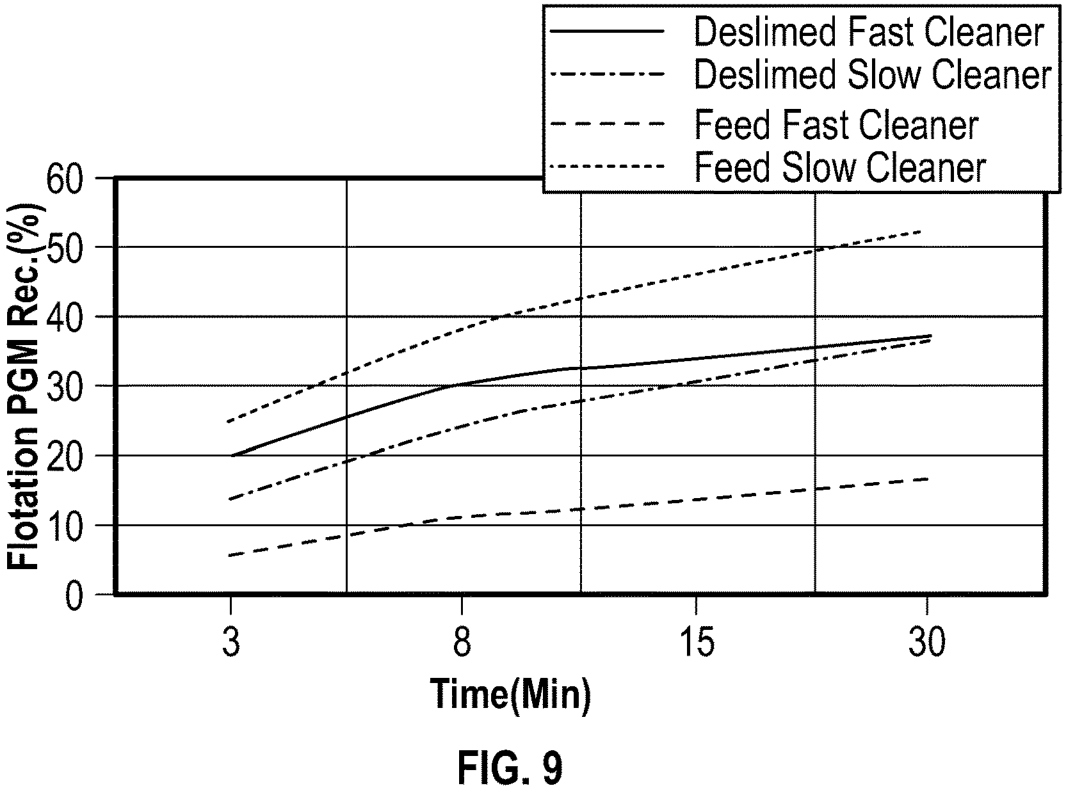
FIG. 9 depicts a plot of fast and slow cleaner kinetics observed for embodiments of the methods described herein.

The cleaner flotation kinetics were also observed to improve significantly (see FIG. 9), similarly to the rougher scavenger kinetics improvement observed in the second phase testing of this example. For the raw feed combined fast and slow cleaner test, 25 wt % of the PGMs recovered to concentrate were from the fast cleaner, compared to 50 wt % for the deslimed cake cleaner.

Confirmatory Classification Testing—A final phase of testing was conducted on the remaining volume of the original bulk sample to validate PGM results from certain settings for the sample, and to assess the impact of the use of a dispersant prior to classification.

In this example, sodium silicate ($Na_2SiO_3$), a chemical dispersant, was used to determine whether it influenced talc rejection and/or PGM recovery across the centrifuge. The results from the centrifuge classification tests are provided at the following table:

Centrifuge Classification Results

| Feature | Test No. 1 | Test No. 2 |
|---|---|---|
| Feed solids (wt %) | 33.2 | 24.7 |
| Bowl speed (%) | 70 | 75 |
| Feed flowrate ($m^3$/h) | 1.75 | 1.73 |
| 4e PGM grade (gpt) (platinum, palladium, rhodium, gold) | 3.7 | 3.8 |
| $Na_2SiO^3$ dose (kg/t) | — | 1.0 |
| $S_{50}$ (μm) (Cut-off Particle Size) | 5.3 | 3.9 |
| Solids recovery (wt %) | 91.6 | 91.9 |
| Liquid recovery (wt %) | 12.9 | 7.8 |
| 4e PGM recovery (wt %) | 92.4 | 92.6 |
| $Cr_2O_3$ recovery (wt %) | 98.4 | 98.8 |

The results of the tests indicated a potential for additional uplift in PGM recovery and talc rejection through further centrifuge adjustments and the use of dispersants and/or other additives described herein.

Example 6—Phosphate Valorization

In this example, tailings from a phosphate washery were processed by an embodiment of the methods described herein. The phosphate washery separated gangue minerals, clay, and apatite (phosphate rock). The plant used cyclone classification to separate solids having sizes less than about 40 μm, with ultra-fines reporting to the tailings.

The presence of ultra-fine particles (e.g., <3 μm)—especially ultra-fine clay particles—in a flotation feed can undesirably impact flotation performance, such as by requiring increased reagent consumption, reducing a final concentrate grade, or a combination thereof. These disadvantages were avoided by using an embodiment of the methods described herein to remove from the sub-40 μm fraction the solids having sizes less than about 20 μm.

In this example, the sub-40 μm phosphate washery stream was disposed in a tailings thickener, and the underflow was disposed in a solid bowl centrifuge. The solid bowl centrifuge produced a centrate that included the solids having sizes less than or equal to 20 μm, and a cake that included the solids having sizes from >20 μm to about 40 μm.

The cake was then subjected to a valorization procedure, which, in this example, included disposing the cake in a first flotation apparatus to separate carbonates from the solids having sizes from >20 μm to about 40 μm, and a second flotation apparatus to separate silicas from the solids having sizes from >20 μm to about 40 μm.

Example 7—Iron Ore Valorization

In this example, embodiments of the methods described herein were used to recover iron ore as a material of interest. Iron ore washeries typically separate gangue minerals (e.g., quartz and clay) from iron ore. These plants typically use cyclone classification to separate materials having sizes of less than about 40 μm. This fraction includes "ultra-fines", which are commonly referred to as slimes.

The recovery of iron ore from sub-40 μm fractions is possible with techniques, such as wet high intensity magnetic separators (WHIMS). The presence of ultra-fine particles (e.g., <3 μm), especially clay, in a WHIMS feed, however, can reduce separation performance. The detrimental impact of ultra-fine particles observed in this example included lower Fe grades, and greater concentrations of contaminants (e.g., $SiO_2$ and $Al_2O_3$). It is believed that these disadvantages may be due, at least in part, to increased slurry viscosity, higher entrainment of ultra-fines, or a combination thereof.

In this example, WHIMS tests were performed on unclassified slimes and slimes that had been classified with a solid bowl centrifuge to remove ultra-fines having sizes <3 μm.

| Flowsheet | Mineral Product Grade % Fe | Mineral Product % $SiO_2$ | Mineral Product % $Al_2O_3$ | Mineral Mass Recovery (%) |
|---|---|---|---|---|
| Unclassified Slimes | 53 | 15 | 3 | 71 |
| Slimes Subjected to Solid Bowl Centrifuge Classification to remove ultra-fines (<3 μm) | 63 | 6 | <1 | 38 |

The results of this table demonstrate that embodiments of the methods of solid bowl classification described herein improved the WHIMS results.

In an additional series of test, an evaluation was conducted of the metallurgical benefits associated with removing ultra-fines (~5 μm) from particular tailings prepared as a feed stream for Wet High Intensity Magnetic Separation (WHIMS) beneficiation.

A bulk sample was received, and a comprehensive laboratory scale test work program was completed, which included centrifuge classification, and WHIMS beneficiation of raw feed and classified cake. Results were evaluated to assess the impact on iron recovery and grade.

Centrifuge classification was undertaken on the sample of WHIMS feed to understand the efficiency of ultra-fines rejection and iron recovery at various settings. The results demonstrated that the classification method was capable of consistently delivering an efficient, low cut-off particle size (about 5 μm), and about 87% of solids were recovered to cake. The speed and differential of the centrifuge allowed for effective ultra-fines removal, while maintaining high iron recovery. Also, it should be noted that ultra-fine iron ore particles (<5 μm) lost during classification were difficult to recover through WHIMS.

Samples of raw feed and classified cake were beneficiated with WHIMS at a bench scale to assess the impact classification has on product grade. The impact of classification on WHIMS was as follows: classification prior to WHIMS resulted in a 10 percentage point (p.p.) increase in iron grade compared to WHIMS performed on the raw feed.

Samples of raw feed and classified cake were beneficiated with WHIMS at a pilot-scale to assess the impact on WHIMS recovery for the following circuits: (i) Unclassified rougher WHIMS; (ii) Classified rougher WHIMS; (iii) Classified rougher+cleaner WHIMS; and (iv) Classified rougher+scavenger WHIMS.

The classified cake results are depicted at the following table:

| Flowsheet | Feed Source | Product Grade % Fe | Product % $SiO_2$ | Product % $Al_2O_3$ | WHIMS Recovery (%) | Total Recovery (%) |
|---|---|---|---|---|---|---|
| Rougher | Raw slimes | 54 | 13 | 4.3 | 57 | 57 |
| Rougher | Classified | 58 | 9.6 | 3.0 | 43 | 36 |
| Rougher + Cleaner | Classified | 64 | 4.5 | 2.5 | 34 | 30 |
| Rougher + Scavenger | Classified | 58 | 9.7 | 3.2 | 49 | 42 |

The results showed that the classification process of this example permits WHIMS to generate a higher grade iron concentrate in all cases. The various WHIMS circuit configurations allowed grade and recovery to be optimised, depending on preferred product specifications. The following results were observed—

Unclassified Rougher WHIMS: A 54% Fe grade was achieved treating unclassified material. The concentrate grade and levels of contaminants were considered high and the recovered concentrate was considered unsaleable.

Classified Rougher WHIMS: A 4 percentage points (p.p.) increase in iron grade was achieved compared to the unclassified rougher WHIMS tests. This result achieved a saleable grade for a 21 percentage point (p.p.) reduction in iron recovery.

Classified Rougher+Cleaner WHIMS: A cleaner stage after the classified rougher delivered a further 6 p.p. uplift in grade. This result achieved the highest iron grade (64% Fe) and lowest iron recovery (30% Total iron recovery). The achieved concentrate qualities were considered high grade.

Classified Rougher+Scavenger WHIMS Circuit: A scavenger stage after the classified rougher WHIMS facilitated higher recovery at an equivalent rougher concentrate quality. This indicated further optimisation of recovery of the classified flowsheet is likely.

The test results indicate a material benefit is to be expected through classification. For example, the results show potential for an uplift in grade (~20%) but more importantly increasing grade from an unsaleable (54% Fe) to a saleable grade (64% Fe) as a premium product.

WHIMS testing of this example was conducted on a Longi 500 mm Vertical Pulsating High Gradient Magnetic Separator (VPHGMS) pilot-scale WHIMS.

Phase 1 classification testing—Phase 1 included initial classification tests to assess classification efficiency and the influence of centrifuge parameters on classification outcomes. Testing focused on varying bowl speed and differential rates. The handleable cake and dirty centrate gave a visual indication of the removal of ultra-fine material. As part of the testing the centrifuge classification was benchmarked against a 40 mm diameter hydrocyclone, which is considered the industry standard for ultra-fine classification.

The solid bowl centrifuge tests achieved cut points from 2 μm to 4 μm compared to 15 μm achieved for the hydrocyclone. It was also observed in this example that higher bowl speed increased solids recovery to cake; higher scroll differential increased solids recovery; and classification was primarily a size separation, with a smaller density effect. The Phase 1 centrifuge classification results are provided at the following table.

| Classification | Bowl Speed (%) | Differential (n) | Solids Recovery (%) | $Al_2O_3$ Rejection (%) |
|---|---|---|---|---|
| 40 mm hydrocyclone | | | 37 | 77 |
| Solid bowl centrifuge | 50 | 5 | 81 | 31 |
| | 50 | 15 | 87 | 19 |
| | 70 | 15 | >99 | — |

Phase 1—WHIMS testing: Phase 1 included initial WHIMS tests to assess the impact of classification prior to WHIMS on achievable grade. The results indicated a material uplift in concentrate qualities with prior classification. WHIMS test results for phase 1 are depicted at Table 4. Generally, classified rougher WHIMS achieved 10 p.p. higher grade compared to unclassified; and classified rougher and cleaner tests achieved lower contaminants levels of silica and alumina compared to unclassified rougher and cleaner tests.

| Flowsheet | Feed Source | Product Grade % Fe | Product % $SiO_2$ | Product % $Al_2O_3$ |
|---|---|---|---|---|
| Rougher | Raw slimes | 53 | 14.8 | 3.0 |
| Rougher + Cleaner | Raw slimes | 59 | 8.8 | 1.6 |
| Rougher | Classified | 63 | 6.4 | 0.9 |
| Rougher + Cleaner | Classified | 64 | 4.7 | 0.6 |

Phase 2—classified and unclassified WHIMS testing: Results from the phase 1 testing informed the centrifuge settings for Phase 2. Fourteen tests were completed using pilot-scale WHIMS to process unclassified and classified feeds to determine the grade and recovery uplift across rougher and cleaner WHIMS. During the testing program, the WHIMS magnetic strength, matrix type and pulsation stroke and frequency were varied to determine optimal settings. The results are included in Table 5 below. The Phase 2 centrifuge classification results are depicted at the following table.

| Flowsheet | Feed Source | Product Grade % Fe | Product % SiO2 | Product % Al2O3 | WHIMS Recovery (%) | Total Recovery (%) |
|---|---|---|---|---|---|---|
| Rougher | Raw slimes | 54 | 12-13 | 4.3 | 57-61 | 57-61 |
| Rougher | Classified | 58 | 9.6 | 3.0 | 43 | 36 |
| Rougher + Cleaner | Classified | 64 | 4.5 | 2.5 | 34 | 30 |
| Rougher + Scavenger | Classified | 58 | 9.7 | 3.2 | 49 | 42 |

In summary, the results of this example demonstrated that classification permitted WHIMS to generate a higher grade iron concentrate in all cases. The various WHIMS circuit configurations allowed grade and recovery to be improved or optimized, depending on preferred product specifications.

A 54% Fe grade was achieved treating unclassified material. The concentrate grade and levels of contaminants were considered high and the recovered concentrate is considered unsaleable.

A 4 percentage points (p.p.) increase in iron grade was achieved compared to the unclassified rougher WHIMS tests. This result achieved a saleable grade for a 21 percentage point (p.p.) reduction in iron recovery.

A cleaner stage after the classified rougher delivered a further 6 p.p. uplift in grade. This result achieved the highest iron grade (64% Fe) and lowest iron recovery (30% Total iron recovery). The achieved concentrate qualities is considered high grade.

A scavenger stage after the classified rougher WHIMS enabled higher recovery at an equivalent rougher concentrate quality. This indicates further optimisation of recovery of the classified flowsheet is likely.

Example 8—Iron Grade and Recovery from HPAL Residue

In this example, nickel laterite was treated through a high-pressure acid leach (HPAL) process to recover nickel and cobalt.

An HPAL residue was subjected to an embodiment of the classification methods described herein. Treatment with a solid bowl centrifuge simultaneously classified ultra-fine Fe for valorization to the centrate, and de-watered coarse gypsum for dry disposal as a cake.

Figure 10:
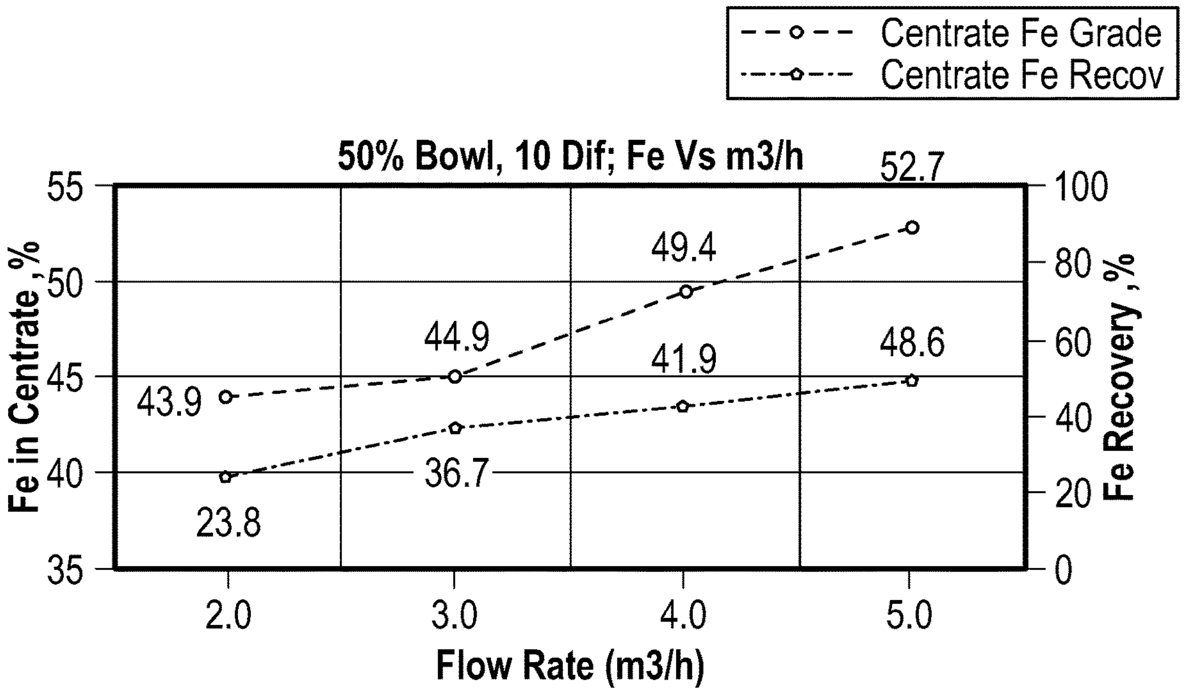
FIG. 10 depicts a plot of iron concentration in a centrate versus flow rate.
Figure 11:
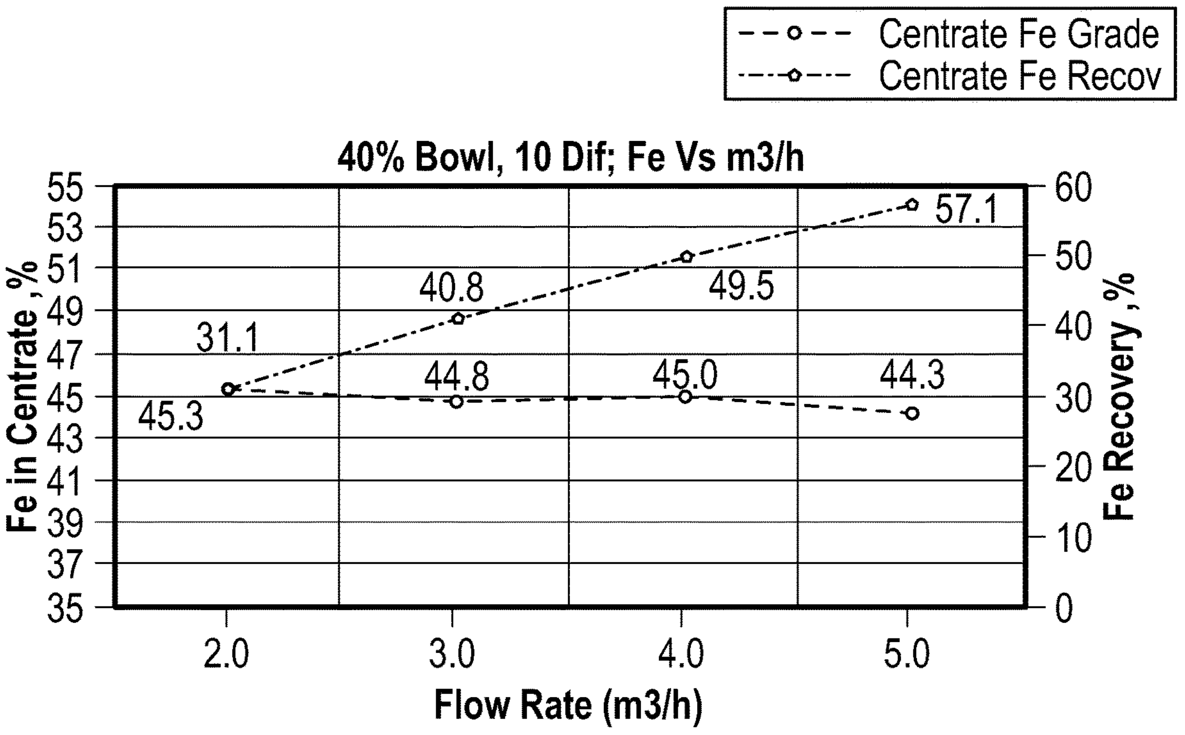
FIG. 11 depicts a plot of iron concentration in a centrate versus flow rate.

The treatment with a solid bowl centrifuge also delivered a large increase in Fe concentration. In this example, 30 classification tests were completed at 30 wt % solids using gypsum saturated water an ambient conditions. As depicted at FIG. 10, high G-force centrifuge operation increased iron content from 34% to 53% at 48.6% Fe recovery to the centrate. As depicted at FIG. 11, low G-force centrifuge operation increased iron content from 34% to 44.3% Fe at 57.1% Fe recovery to the centrate. Both of these centrifuge settings delivered high sulphur rejection to the cake.

The classified centrate may be further valorized using any known technique—e.g., leaching, WHIMS, flotation, etc.—to further increase Fe content, such as to a typically sellable grade.

We claim:

1. A method of classification and recovery, the method comprising:

providing a first stream comprising a first plurality of solids, wherein the first plurality of solids comprises a material of interest, wherein the material of interest consists of a phosphorus-containing compound, a native metal, a metal-containing compound, a mineral, or a combination thereof, and wherein a first portion of the first plurality of solids has sizes greater than a first cut-off particle size, and a second portion of the first plurality of solids has sizes less than or equal to the first cut-off particle size, wherein the first cut-off particle size is from about 5 μm to about 100 μm;

disposing the first stream in a first solid bowl centrifuge to produce (i) a first cake comprising a second plurality of solids, the second plurality of solids comprising at least 50%, by weight, of the first portion of the first plurality of solids, and (ii) a first centrate comprising a third plurality of solids, the third plurality of solids comprising at least 50%, by weight, of the second portion of the first plurality of solids; and (A) subjecting the first cake or the first centrate to a valorization procedure to produce a product stream comprising at least a portion of the material of interest; or (B) disposing the first cake in a second solid bowl centrifuge to produce (a) a second cake comprising a fourth plurality of solids, and (b) a second centrate comprising a fifth plurality of solids, and subjecting the second cake or the second centrate to a valorization procedure to produce a product stream comprising at least a portion of the material of interest;

wherein a first portion of the second plurality of solids of the first cake has sizes greater than a second cut-off particle size, and a second portion of second plurality of solids of the first cake has sizes less than or equal to the second cut-off particle size, wherein the fourth plurality of solids of the second cake comprises at least 50%, by weight, of the first portion of the second plurality of solids, and wherein the fifth plurality of solids of the second centrate comprises at least 50%, by weight, of the second portion of the second plurality of solids; or (C) disposing the first centrate in a second solid bowl centrifuge to produce (a) a second cake comprising a fourth plurality of solids, and (b) a second centrate comprising a fifth plurality of solids, and subjecting the second cake or the second centrate to a valorization procedure to produce a product stream comprising at least a portion of the material of interest;

wherein a first portion of the third plurality of solids of the first centrate has sizes greater than a second cut-off particle size, and a second portion of third plurality of solids of the first centrate has sizes less than or equal to the second cut-off particle size, wherein the fourth plurality of solids of the second cake comprises at least 50%, by weight, of the first portion of the third plurality of solids, and wherein the fifth plurality of solids comprises at least 50%, by weight, of the second portion of the third plurality of solids;

wherein the valorization procedure recovers in the product stream at least 5%, by weight, more of the material of interest that is present in the first stream than an identical valorization procedure performed directly on the first stream, with the proviso that the material of interest does not include calcium carbonate.

2. The method of claim 1, wherein, if applied, the second cut-off particle size is from about 2 μm to about 100 μm, and wherein the valorization procedure (i) recovers in the product stream at least 10%, by weight, more of the material of interest than an identical valorization procedure performed directly on the first stream, (ii) has a throughput capacity that is at least 20% greater than an identical valorization procedure performed directly on the first stream, (iii) achieves an uplift in grade of the material of interest of at least 4 percentage points relative to an identical valorization procedure performed directly on the first stream, or (iv) a combination thereof.

3. The method of claim 2, wherein the first cut-off particle size and, if applied, the second cut-off particle size, independently, are selected from about 5 μm to about 40 μm, and from about 2 μm to about 40 μm, respectively.

4. The method of claim 1, wherein the first cake is subjected to the valorization procedure.

5. The method of claim 1, wherein the first cut-off particle size is greater than the second cut-off particle size.

6. The method of claim 5, wherein the first centrate is disposed in the second solid bowl centrifuge to produce the second cake and the second centrate.

7. The method of claim 6, wherein the second cake is subjected to the valorization procedure.

8. The method of claim 1, wherein the first cut-off particle size is less than the second cut-off particle size.

9. The method of claim 8, wherein the first cake is disposed in the second solid bowl centrifuge to produce the second cake and the second centrate.

10. The method of claim 9, wherein the second cake is subjected to the valorization procedure.

11. The method of claim 1, wherein, if applied, the second cut-off particle size is from about 2 μm to about 100 μm.

12. The method of claim 1, wherein the first cut-off particle size and, if applied, the second cut-off particle size are independently selected from about 5 μm to about 40 μm, and from about 2 μm to about 40 μm, respectively.

13. The method of claim 1, wherein the first cut-off particle size is about 15 μm to about 40 μm, and the first centrate is disposed in the second solid bowl centrifuge, and wherein the second cut-off particle size is about 2 μm to about 12 μm, and the second cake is subjected to the valorization procedure.

14. The method of claim 1, wherein the valorization procedure comprises a flotation procedure, a leaching procedure, a magnetic separation procedure, or a combination thereof.

15. The method of claim 14, wherein the flotation procedure comprises reverse flotation and direct flotation.

16. The method of claim 15, wherein the flotation procedure comprises:

contacting a liquid and (i) the first cake or (ii) the second cake to produce a diluted cake;

subjecting the diluted cake to reverse flotation to produce a first froth and a second stream comprising an underflow of the reverse flotation, wherein the second stream comprises a first amount of the material of interest; and subjecting the second stream to direct flotation to produce a second froth and a third stream comprising an underflow of the direct flotation;

wherein the second froth is the product stream, which comprises a second amount of the material of interest.

17. The method of claim 1, wherein the first stream comprises a tailings stream, a cyclone overflow, or a flotation feed stream.

18. The method of claim 1, further comprising contacting the first stream and one or more additives before, during, and/or after the disposing of the first stream in the first solid bowl centrifuge.

19. The method of claim 1, wherein the phosphorus-containing compound is selected from the group consisting of a phosphate and a phosphorus oxide.

20. The method of claim 1, wherein the metal comprises a platinum group metal.

21. The method of claim 1, wherein the metal is selected from the group consisting of ruthenium, rhodium, palladium, osmium, iridium, platinum, copper, and iron.

22. The method of claim 1, wherein the metal-containing compound is selected from the group consisting of a metal oxide and a metal carbonate.

* * * * *